Aug. 12, 1969  O. HERMANN  3,460,413
CRANKSHAFT LATHE
Filed Aug. 27, 1965  16 Sheets-Sheet 4
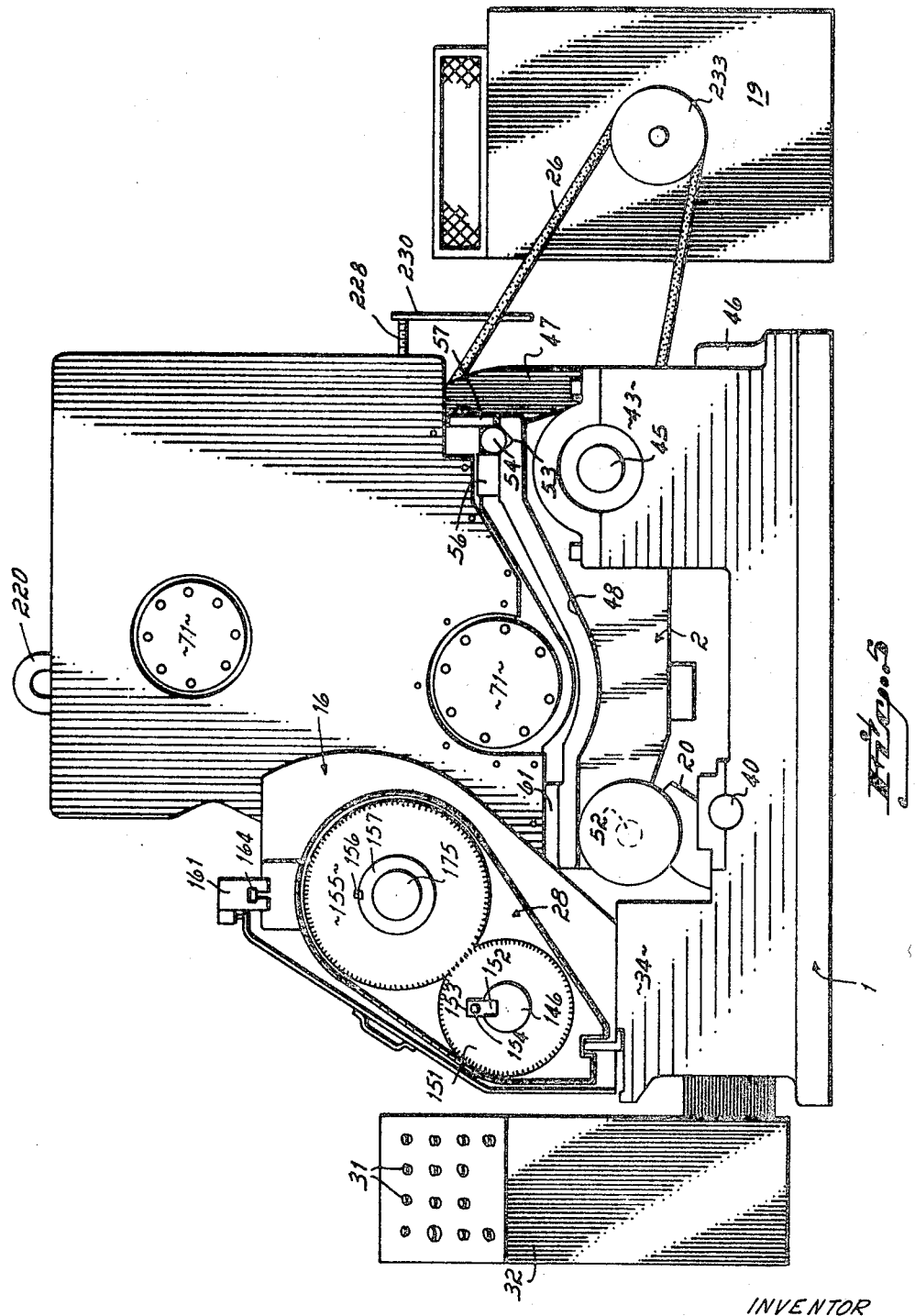
INVENTOR
Otto Hermann
BY
Wood, Herron & Evans
ATTORNEYS

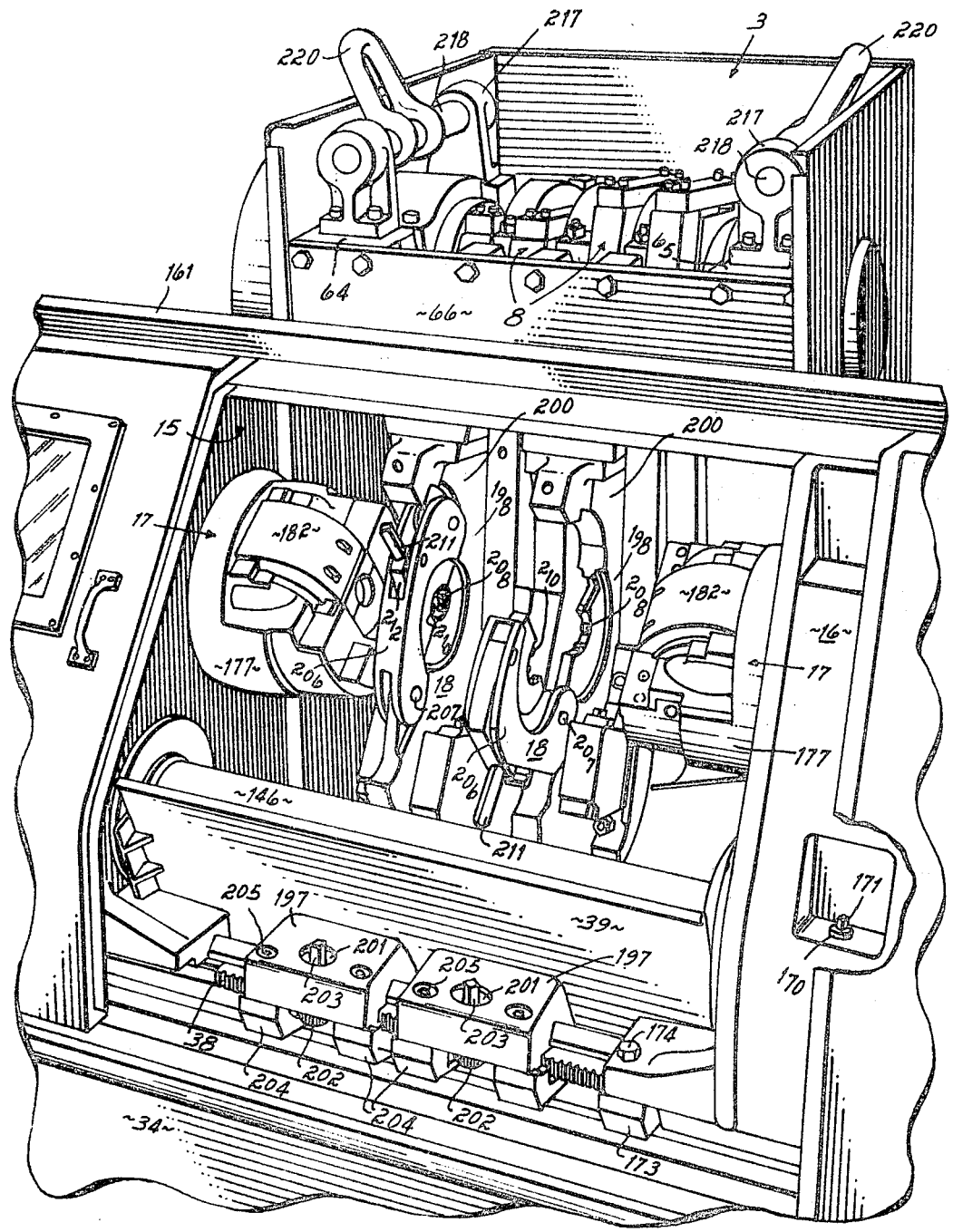

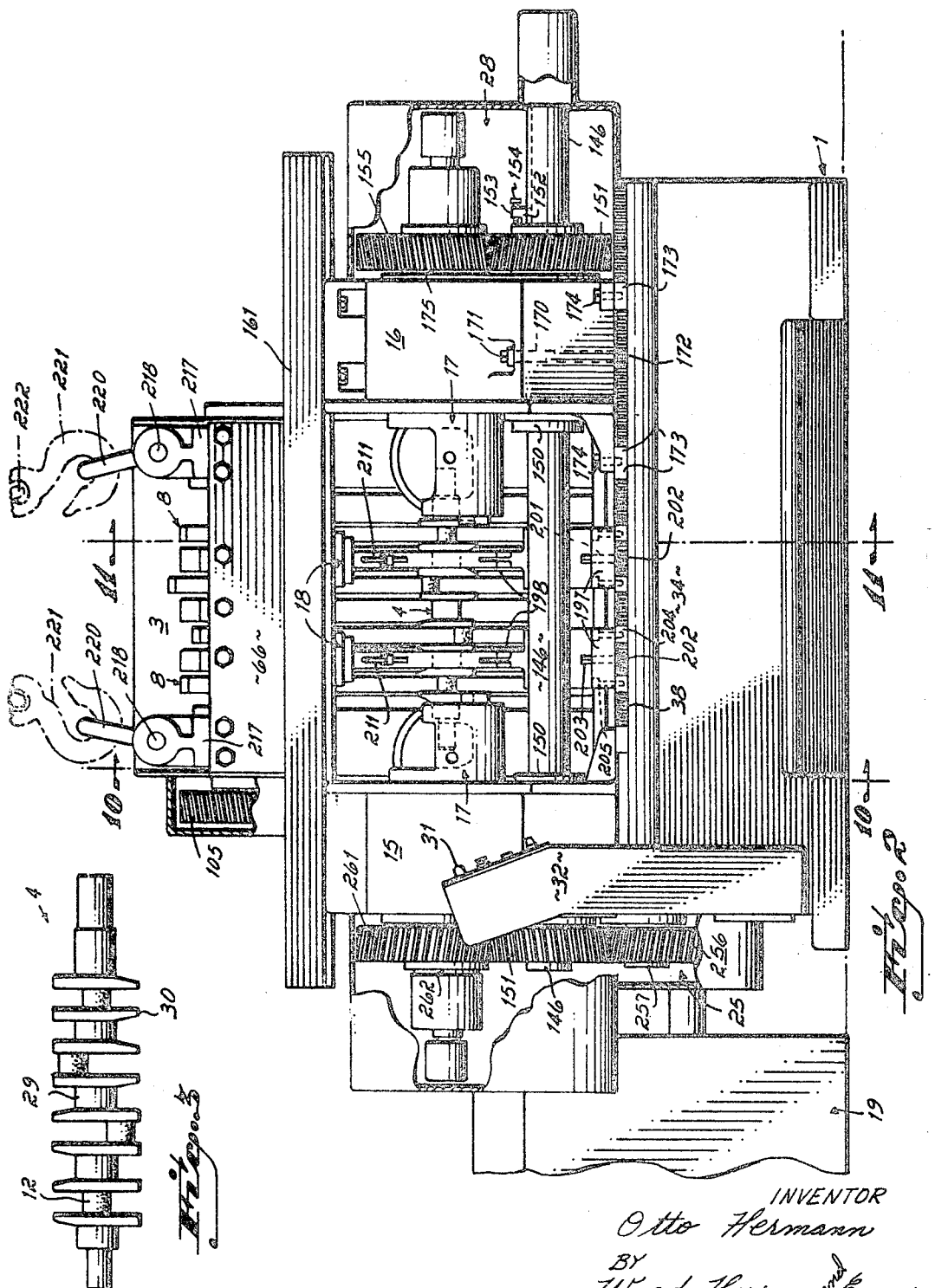

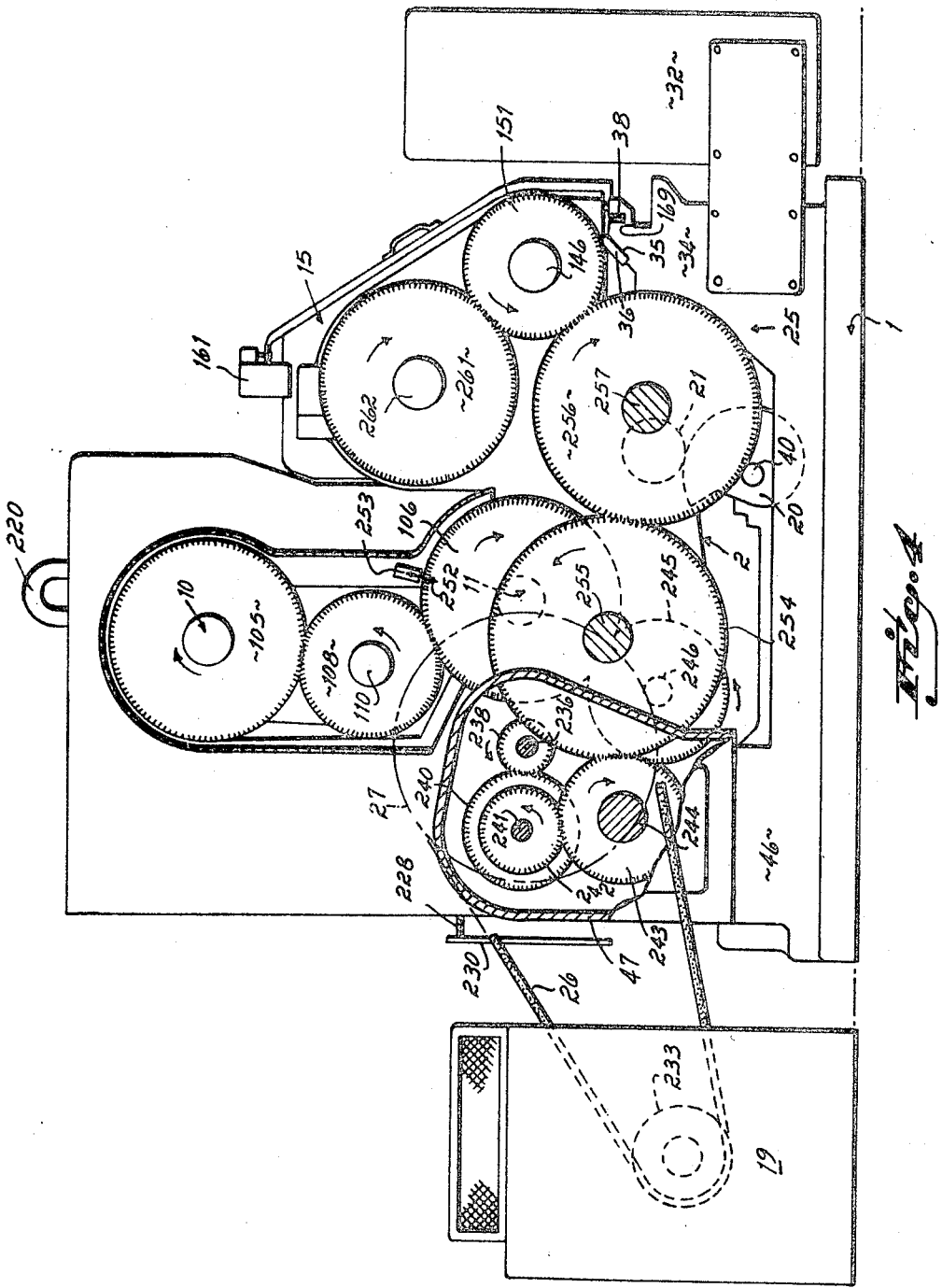

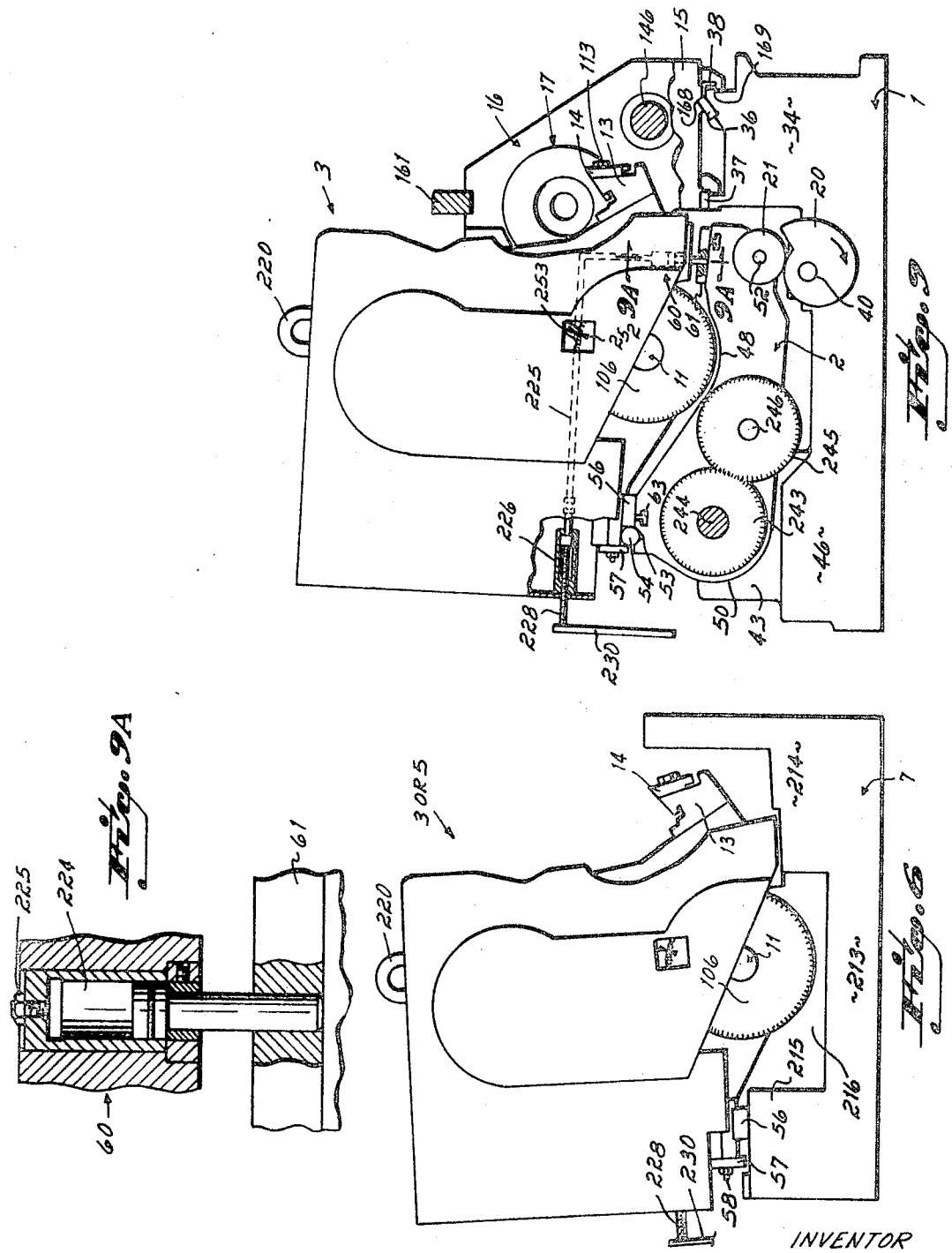

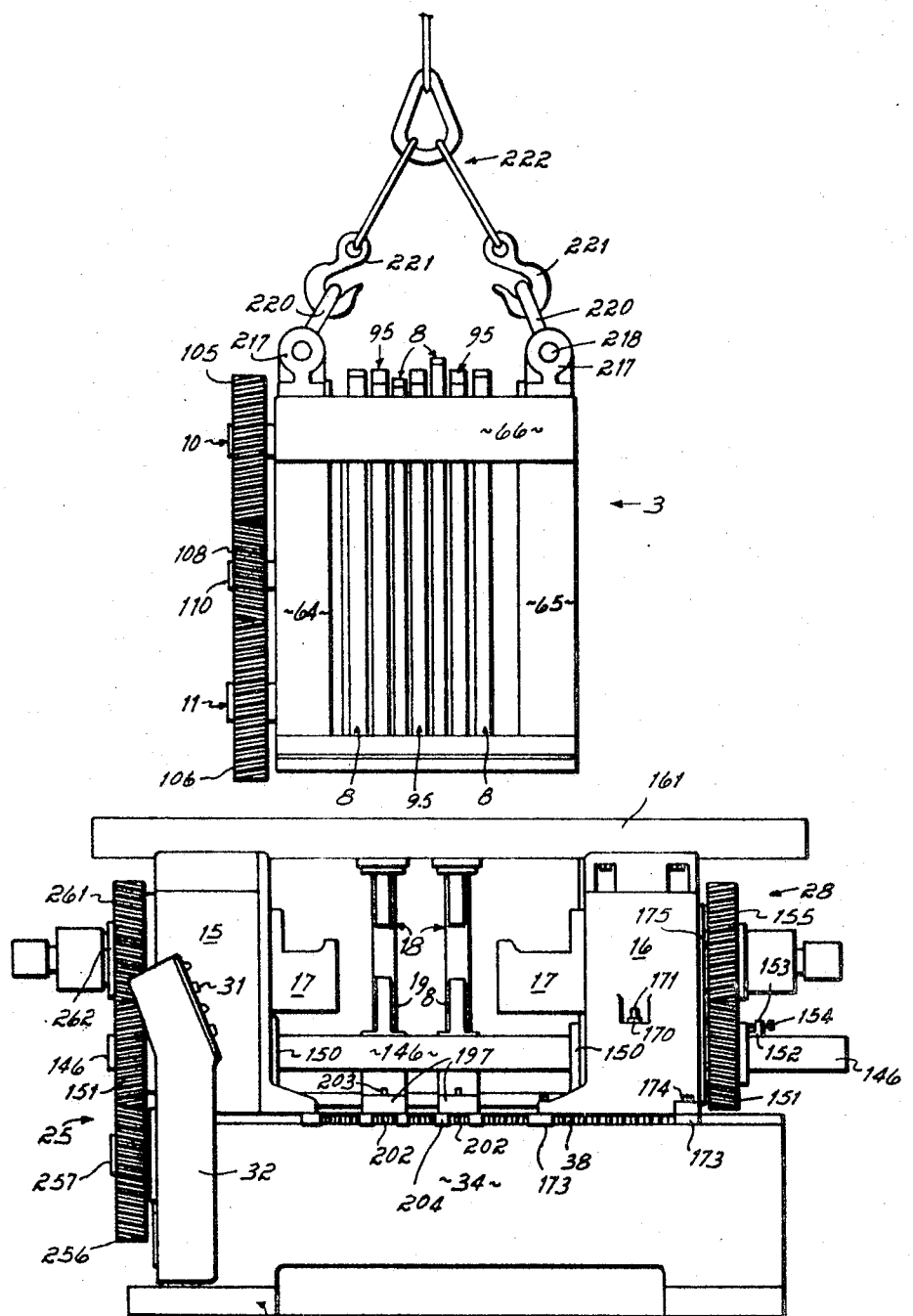

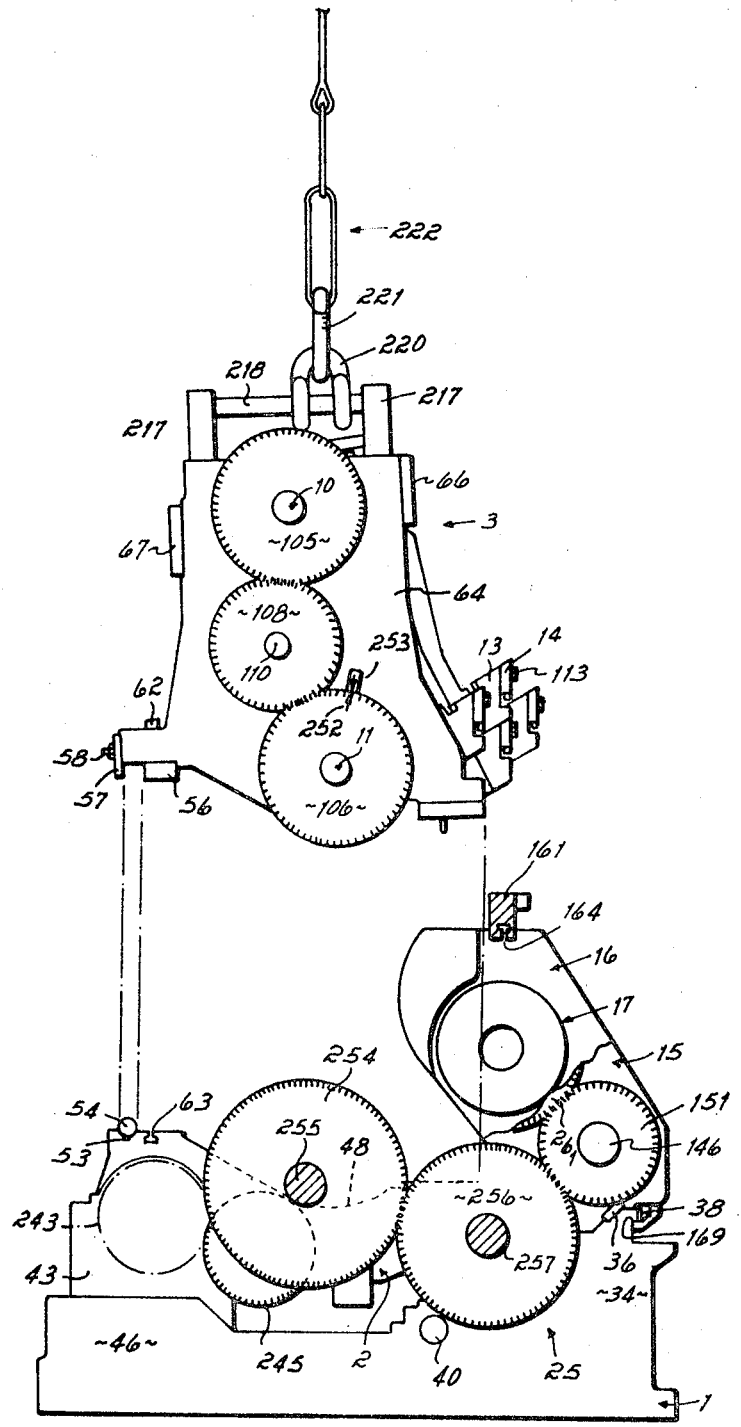

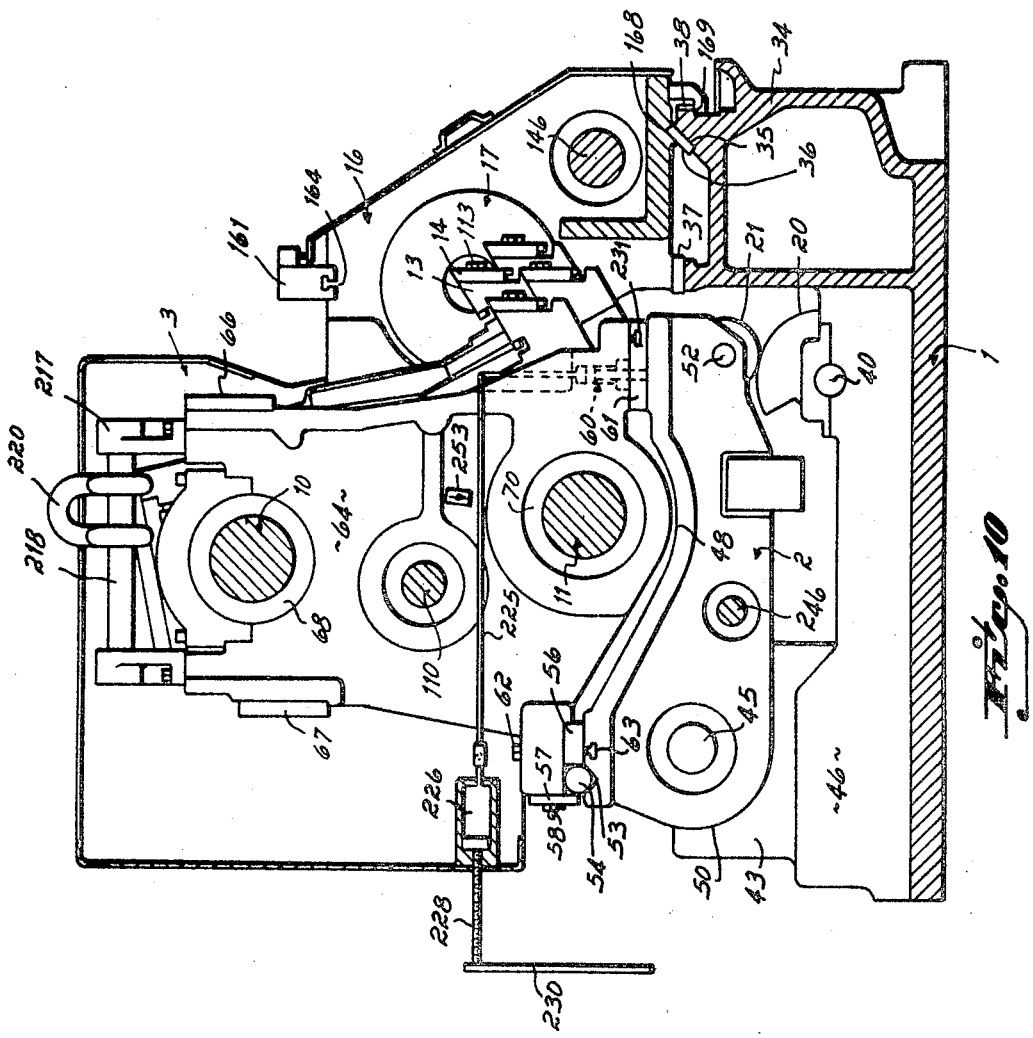

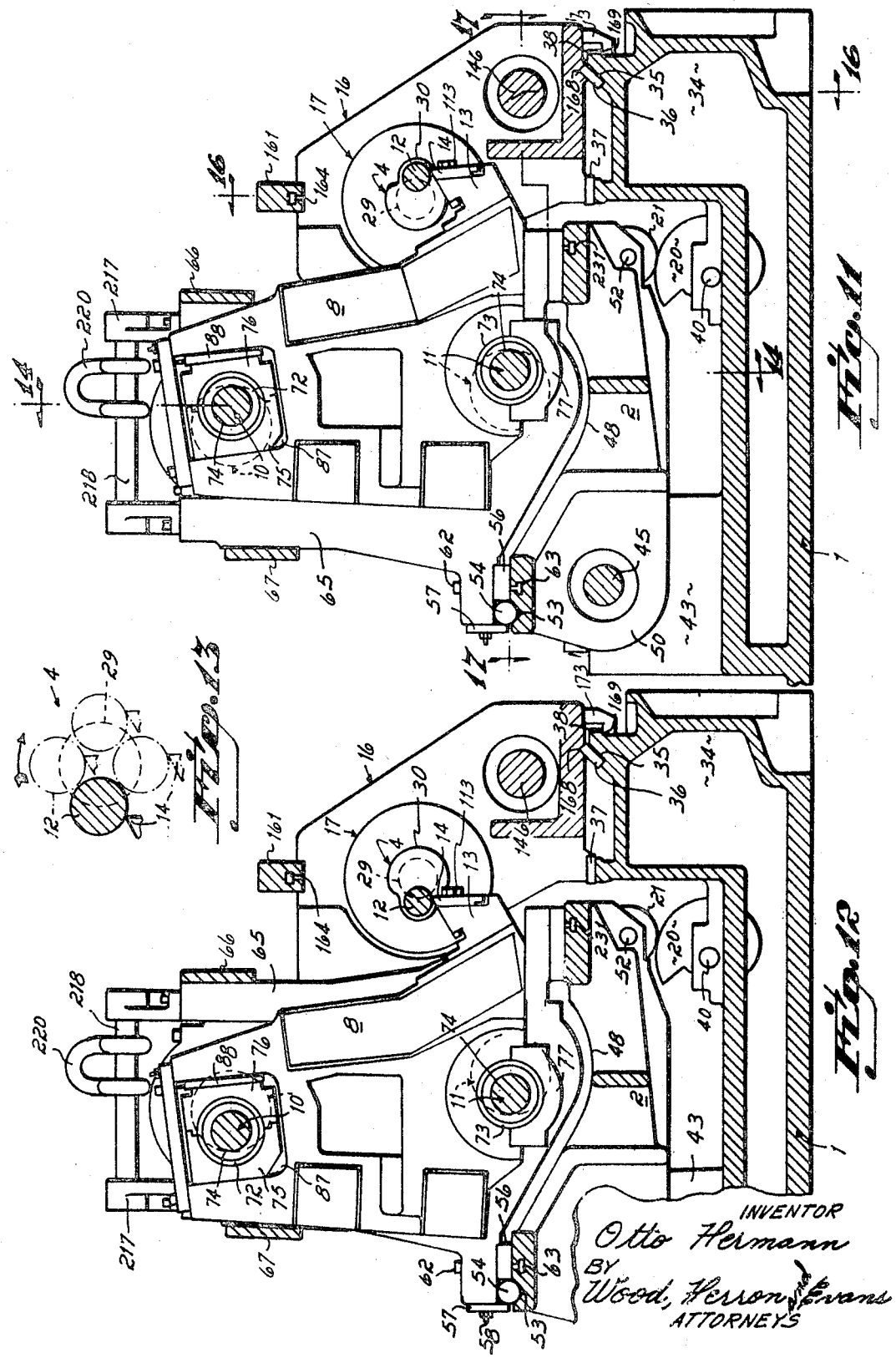

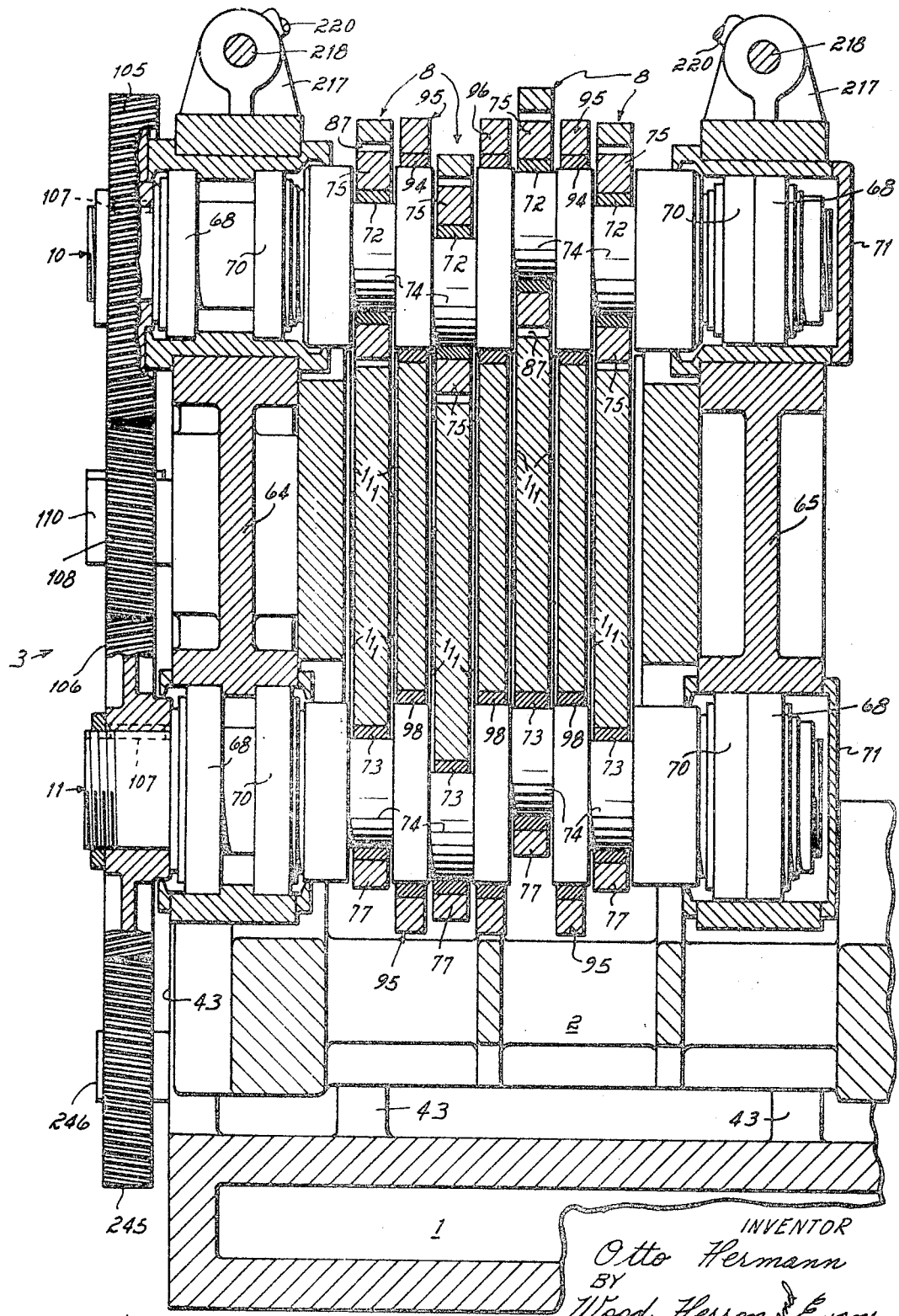

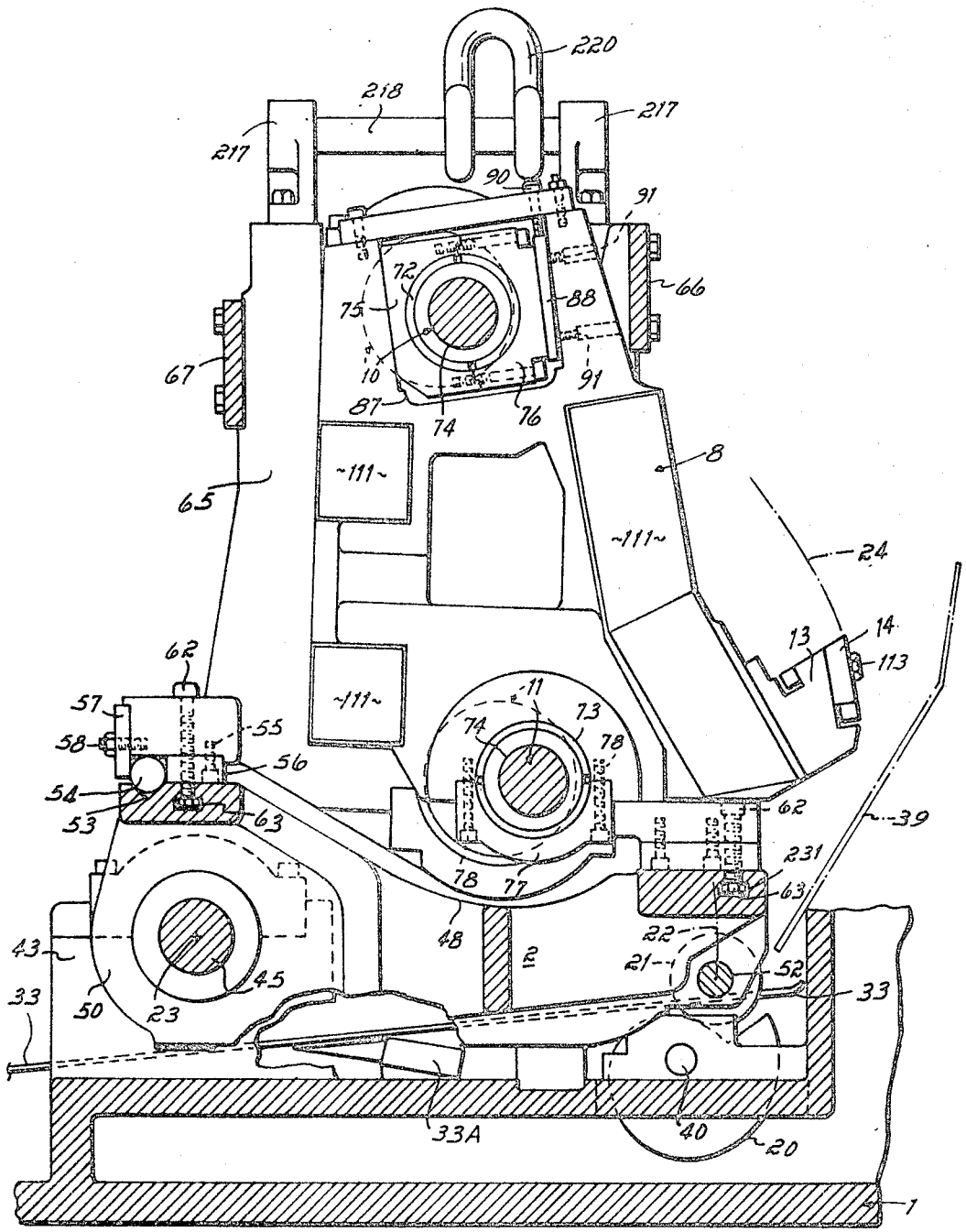

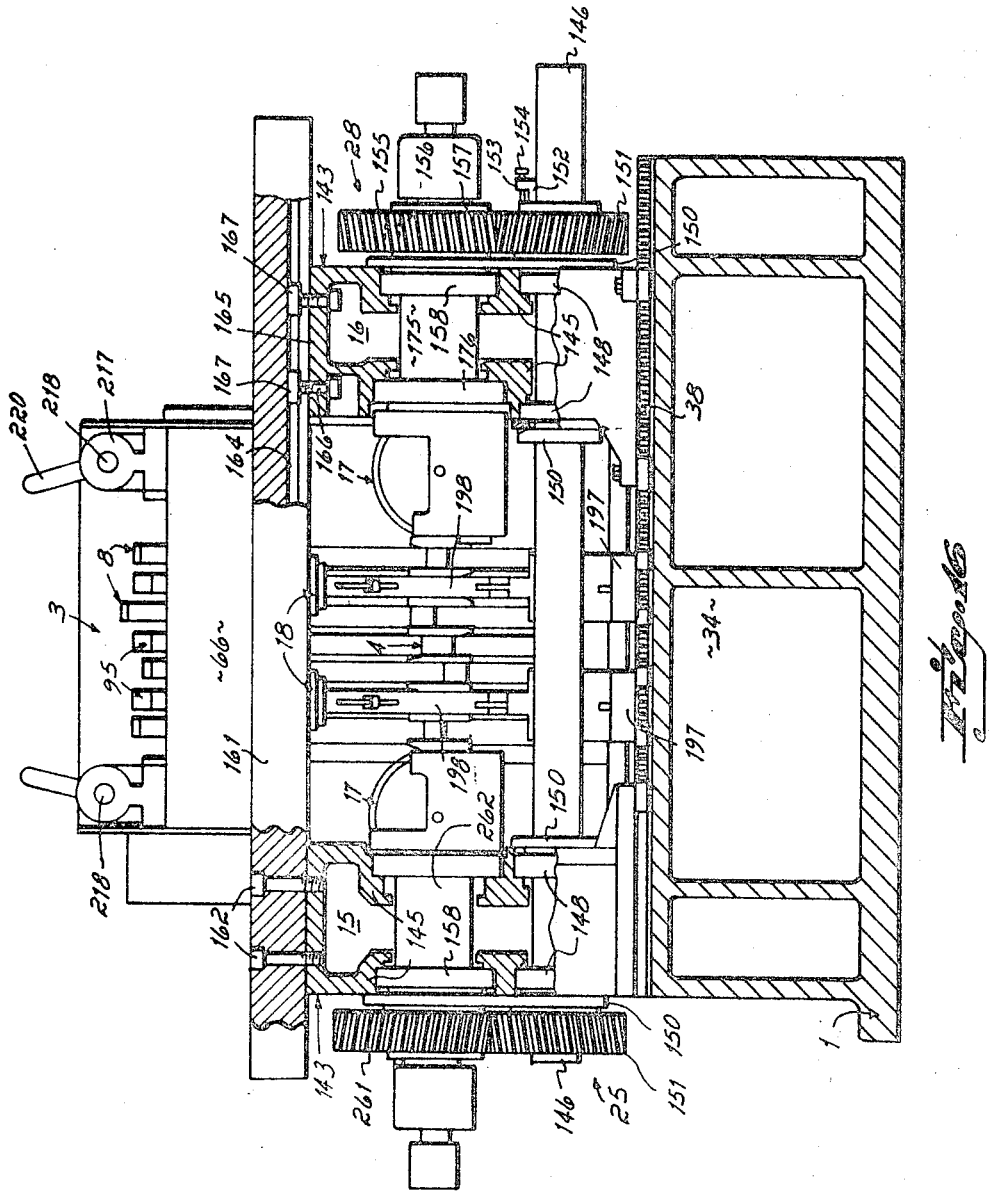

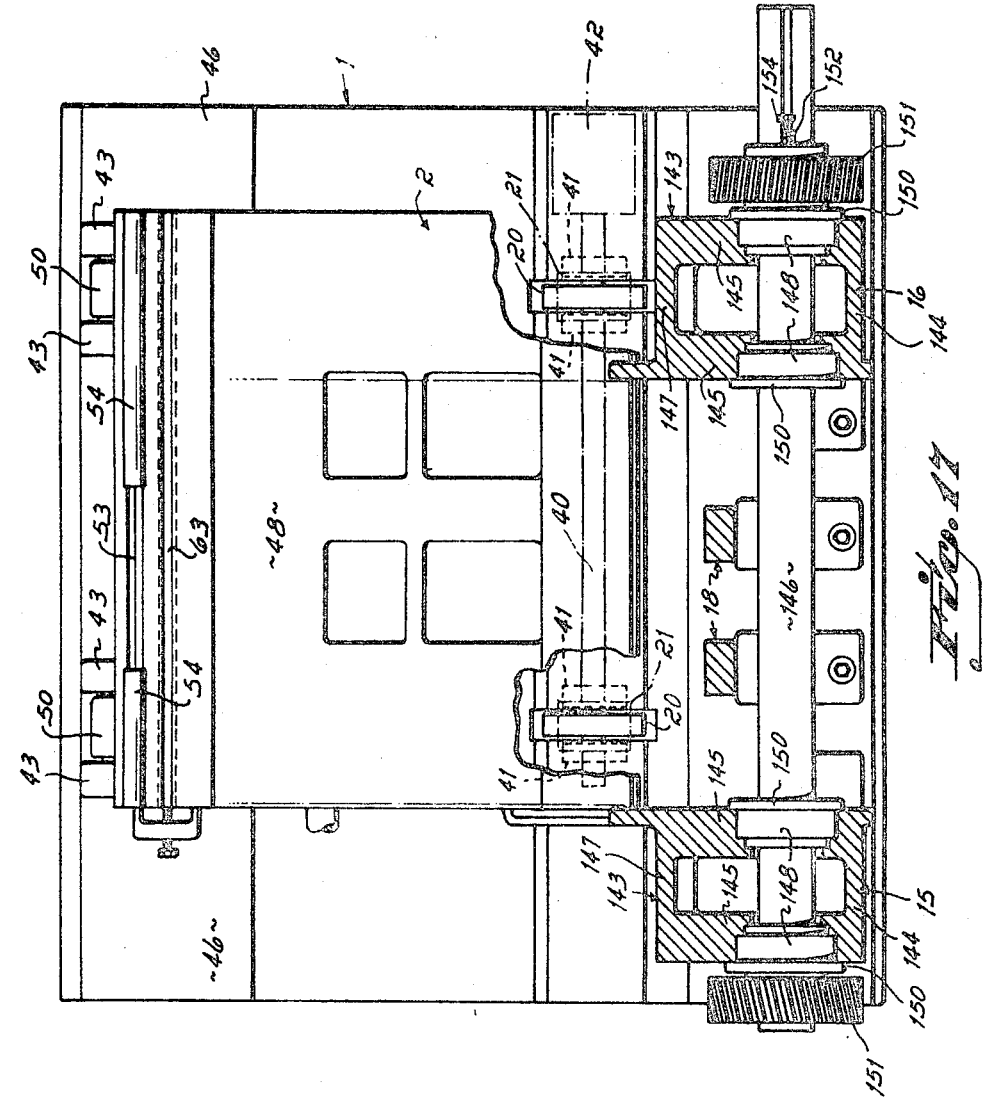
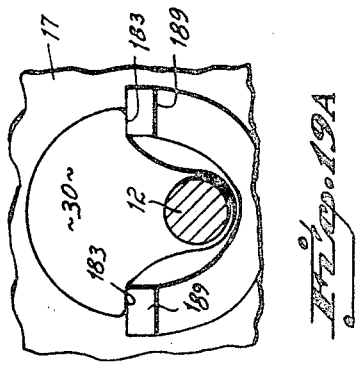

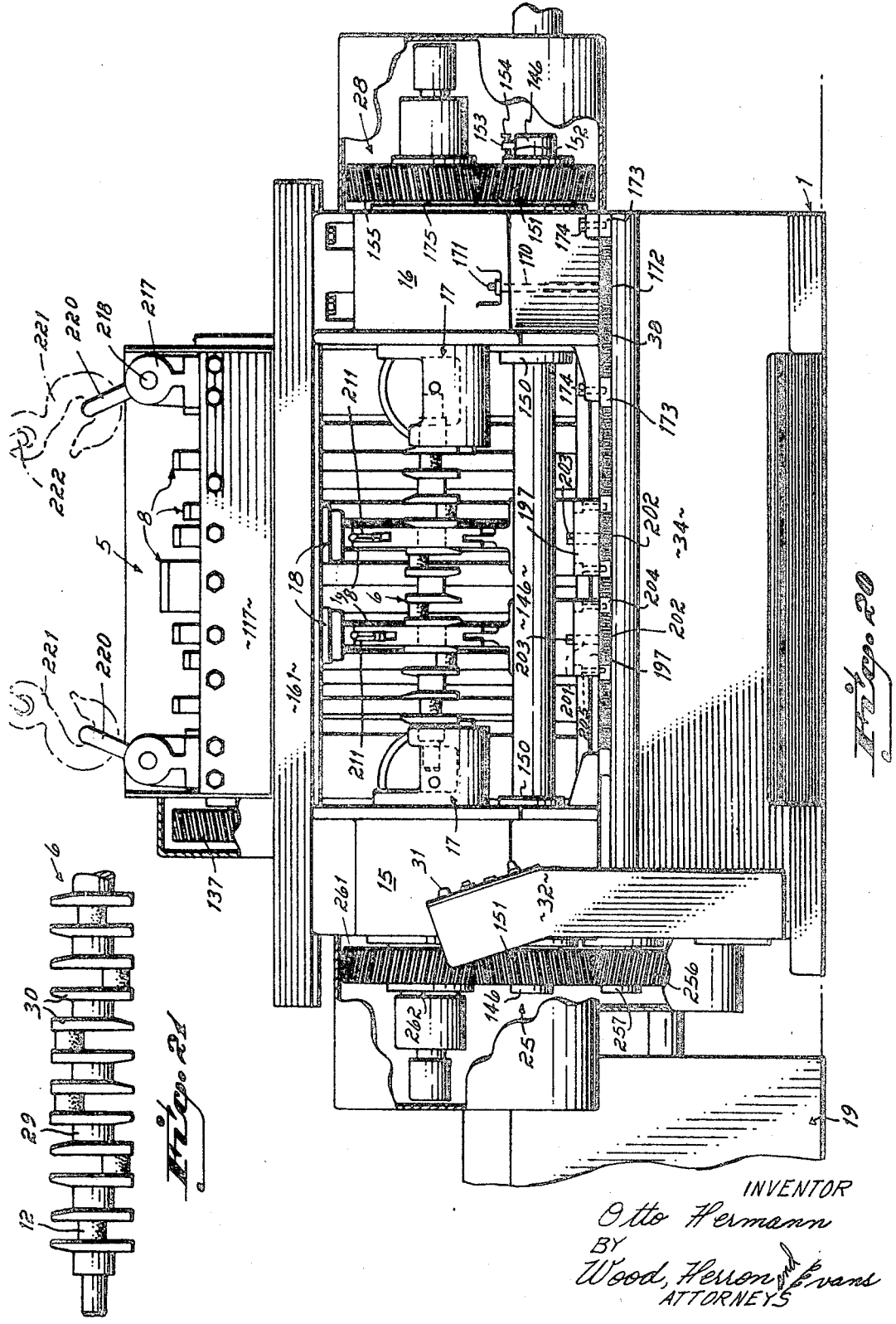

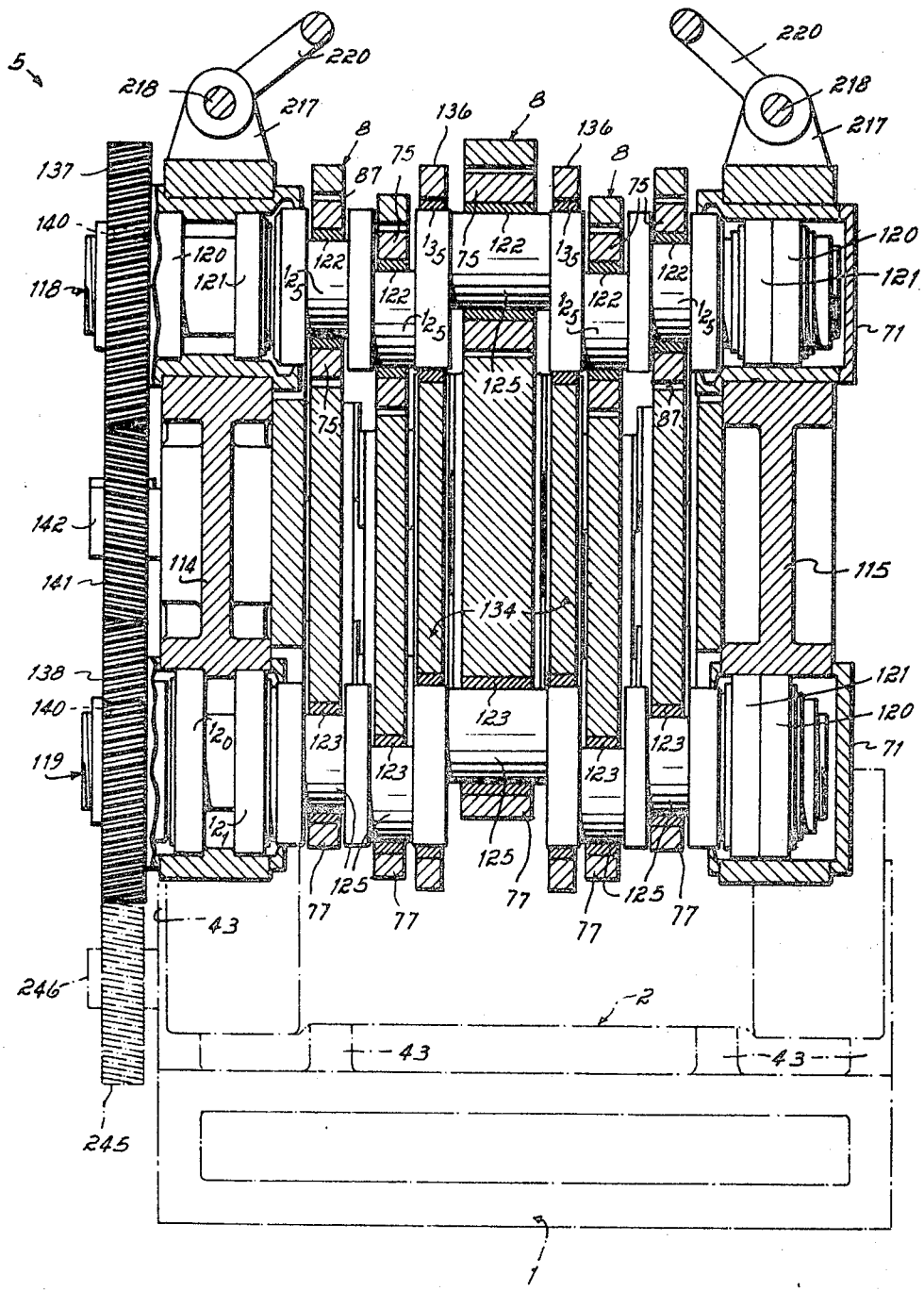

United States Patent Office 3,460,413
Patented Aug. 12, 1969

3,460,413
CRANKSHAFT LATHE
Otto Hermann, Cincinnati, Ohio, assignor to The R. K. Le Blond Machine Tool Co., Cincinnati, Ohio, a corporation of Delaware
Filed Aug. 27, 1965, Ser. No. 483,242
Int. Cl. B23b 5/18, 3/36
U.S. Cl. 82—9                                                18 Claims

ABSTRACT OF THE DISCLOSURE

The disclosure resides in a crankshaft lathe for turning the crankpins of a crankshaft by moving the cutting tools in orbits corresponding to the orbital motion of the crankpins as the crankshaft is rotated. The machine is intended for machining different types and sizes of crankshafts by the use of interchangeable tool packages, each package including master crankshafts, tool carriers and cutting tools for machining a particular type of crankshaft.

---

In general, the lathe comprises a base, a cradle having its rearward portion pivotally connected to the base and disposed generally in a horizontal plane, the cradle being arranged to receive the interchangeable tool packages. Feed cams are mounted for rotation in the base for feeding the cradle and the tool package upwardly relative to the base.

During the cutting cycle, the feed cams rotate from a starting position so as to present the cutting tools to the lower surface of the crankpins at a feed rate, the cutting edges of the tools at the same time moving in orbits corresponding to the orbital motion of the crankpins. The cutting forces which are developed during the machining operation act upon the cutting tools and are transmitted in a substantially straight line downwardly through the tool package and cradle and through the pivotal connection of the cradle to the base and also in part through the feed cams to the base. The forces which react through the crankshaft are transmitted to the headstocks which are also mounted upon the base, such that a rigid relationship exists between the tools and work to inhibit tool chatter.

This invention relates to lathes for machining the crank pins of a crankshaft and is concerned particularly with improvements designed to increase the speed and accuracy of performance. A lathe of this general type is disclosed in Patent No. 3,013,457, issued on Dec. 19, 1961 to R. E. Le Blond et al.

One of the primary objectives of the present invention has been to provide a crankshaft lathe which includes interchangeable tool packages, each of which comprises a self-contained unit capable of machining a given type and size of crankshaft and which are fed into the workpiece as distinguished from the prior patent in which the workpiece is fed into the cutting tools.

Described generally, the present lathe comprises a base which rests upon the floor, with a cradle having its rearward end pivotally connected to the base for swinging tool feed motion in an upward direction during the cutting cycle. The interchangeable tool packages are adapted to be mounted upon the cradle by means of an overhead crane, the arrangement being such that the tool package seats upon the cradle and is accurately located thereon, to be fed upwardly by the cradle.

The crankshaft to be machined is carried in a pair of companion headstocks, at least one of which is slidably mounted upon a bed which forms a part of the base so as to accommodate the length of the crankshaft to be machined. In other words, a tool package for a given size crankshaft may be installed in the machine with complete tooling and ready for operation. One of the companion headstocks are then adjusted along the bed to accommodate the particular type of crankshaft for which the package is designed. After being adjusted, the headstocks are clamped rigidly in position, such that the cutting tools may be fed into the workpiece.

A further objective of the invention has ben to provide an improved tool package which includes a series of tool carriers mounted upon a pair of master crankshafts, each carrier supporting a cutting tool and each tool moving in an orbit coresponding precisely with the orbits of rotary motion of the crank pins.

According to this aspect of the invention, the master crankshafts provide throws corresponding to the throws of the crankshaft which is being machined. Thus, each tool package includes its own cutting tools moving in orbits corresponding to the orbital motion of the master crankshafts which are geared together so as to operate in synchronism with one another and with the workpiece. In order to accommodate any slight differences in the throws of the two master crankshafts, slidable bearings are provided between one of the master crankshafts and its tool carriers.

A further advantage of the present invention arises from the fact that the cutting forces, which act upon the cutting tools, are transmitted in a substantially straight line downwardly to be absorbed in the base of the machine, thereby to prevent tool chatter and loss of accuracy and also to provide greatly increased production speed.

In order to carry out this objective, the cutting tool packages and the cutting tools are arranged to act upon the lower side of the workpiece, such that the cutting forces are transmitted from the tools downwardly and directly into the cradle of the machine. The cradle, in turn, is pivoted directly upon the base of the machine and is fed upwardly by operation of a pair of cams, also journaled in the base. According to this arrangement, all forces which act upon the cutting tool are transmitted directly from the tool carriers to the cradle and from the cradle downwardly to the base which no vibratory forces or tool chatter.

In order to locate the interchangable tool packages accurately, the cradle is provided with cylindrical locating rods mounted in a V-shaped slot formed in the rearward side portion of the cradle. Each tool package is provided with locating bars designed to precisely interfit the locating rods when the respective tool packages are lifted in place upon the cradle.

In order to lower the tool package gently when it is placed upon the cradle, each tool package is provided with a pair of hydraulic cylinders connected to a hand-operated hydraulic pump. The cylinders are provided with plungers which the operator causes to project downwardly when the tool package is in storage or before it is transferred to the cradle. When the tool package is transferred, with its locating bars seated upon the locating rods, the package rests upon the ends of the hydraulic plungers, which, as noted earlier, are in their extended positions. The hydraulic pump is then operated so as to retract the plungers and lower the package to its final position upon the cradle by gravity. After being lowered, the forward portion of the tool package is located precisely by means of taper pins which are driven in place, then the forward edge is clamped securely in place by means of bolts connected to the cradle.

The various features and advantages of the invention will be more clearly apparent to those skilled in the art from the following description taken in conjunction with the drawings.

In the drawings:

FIGURE 1 is a fragmentary perspective view of the front portion of the lathe set up for machining a four-throw crankshaft.

FIGURE 2 is a front elevation of the lathe with the four-throw crankshaft in position to be machined.

FIGURE 3 is a view of the crankshaft before the machining operation.

FIGURE 4 is an end view of the left-hand side of the lathe, showing the driving system and gear train.

FIGURE 5 is an end elevation as viewed from the right-hand end of the machine, further illustrating the driving system.

FIGURE 6 is an end view showing the tool package resting upon its storage platform.

FIGURE 7 is a front elevation showing the tool package prior to being transferred to the lathe.

FIGURE 8 is an end elevation similar to FIGURE 7 showing the tool package being lifted into position with respect to the cradle.

FIGURE 9 is an end view showing the tool package in position upon its cradle, with the hydraulic plungers extended prior to lowering the package to its final position.

FIGURE 9A is a cross section taken along line 9A—9A of FIGURE 9.

FIGURE 10 is a sectional view taken along the line 10—10 of FIGURE 2, showing the hydraulic plungers retracted, with the driving gear of the tool package meshed with its driver.

FIGURE 11 is a sectional view taken along line 11—11 of FIGURE 2, particularly illustrating the master crankshafts and cutting tools of the lathe, with the feed cams shown in the up position.

FIGURE 12 is a view similar to FIGURE 11 showing the motion of the master crankshafts and cutting tools.

FIGURE 13 is a diagrammatic view further illustrating the orbital motion of the crankshaft and cutting tool.

FIGURE 14 is an enlarged sectional view taken along line 14—14 of FIGURE 11 further illustrating the master crankshafts and tool carriers.

FIGURE 15 is a sectional view similar to FIGURE 11 except that the feed cams are shown in the down position.

FIGURE 16 is a sectional view taken along line 16—16 of FIGURE 11 detailing the driving system for the headstocks.

FIGURE 17 is a sectional view taken along line 17—17 of FIGURE 11 illustrating the cradle and a portion of the driving system.

FIGURE 19A is a sectional view taken along the line 19A—19A, illustrating the chuck driving pins in relation to the crankshaft.

FIGURE 20 is a front elevation similar to FIGURE 2, showing the lathe and tool package set up for machining a six-throw crankshaft.

FIGURE 21 is a view of the six-throw crankshaft before machining.

FIGURE 22 is a sectional view similar to FIGURE 14, showing the six-throw package.

GENERAL ARRANGEMENT

Figure 18:
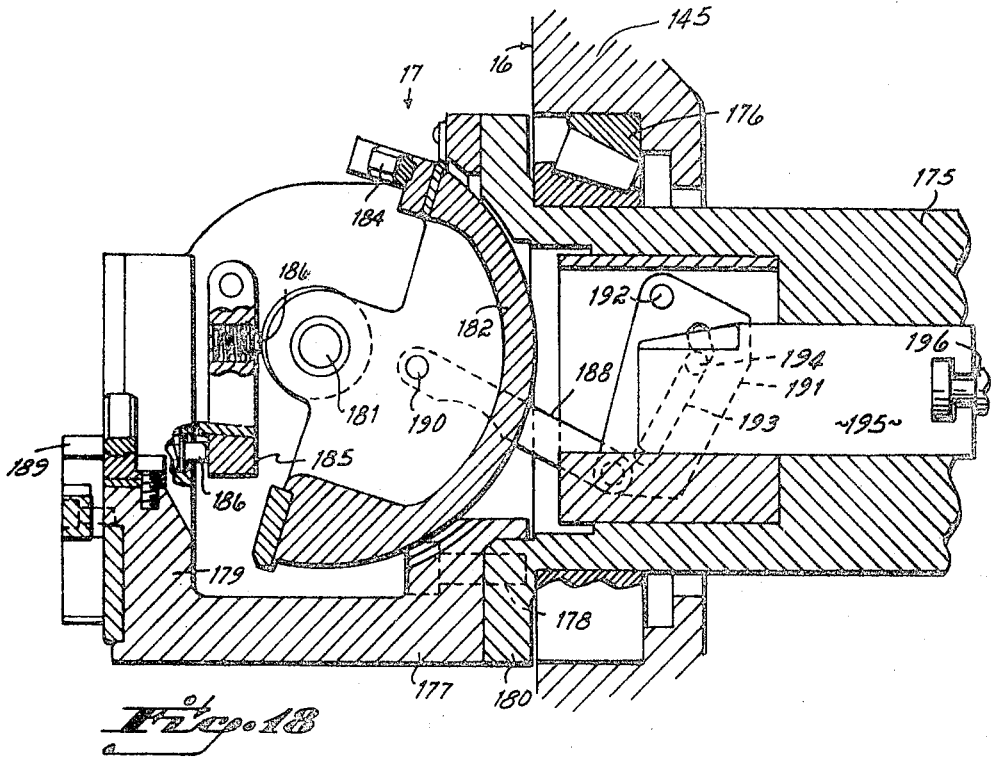
FIGURE 18 is an enlarged fragmentary sectional view taken along line 18—18 of FIGURE 11 illustrating one of the chucks of the machine with its jaw in the open position.

Described generally with reference to FIGURES 2, 11, 12 and 20, the crankshaft lathe, which has been selected to illustrate the principles of the invention, comprises a base 1 having a cradle 2 which forms a permanent part of the base. The interchangeable tool packages, indicated generally at 3 and 5, are adapted to be mounted or demounted selectively with reference to the cradle 2. The tool packages (two in the present example) each comprise a self-contained unit adapted to be conveniently interchanged in order to adapt the lathe to act upon two or more different types of crankshafts. Thus, the tool package 3 (FIGURES 1 and 2) is set up to machine the four crank pins of a typical four-throw crankshaft shown generally at 4 (FIGURE 3) while the tool package 5 (FIGURE 20) is set up to machine six crank pins of a typical six-throw crankshaft shown generally at 6.

As best shown in FIGURE 6, there is provided a storage platform 7 located preferably at the rear of the crankshaft lathe, upon which one of the interchangeable tool packages 3 or 5 is stored while the other is in use. Thus, when the machine is set up for the four-throw crankshaft 4 then the six-throw tool package 5 is placed in storage on platform 7. The operation of interchanging the tool packages for the four or six-throw crankshafts is a relatively simple operation involving the use of a sling and a crane arranged to lift one tool package from the machine and to replace it with the other. As explained in detail later, each self-contained tool package includes the necessary cutting tools, master crankshafts and other components suitable to the machining of the required crankshaft. Thus the package includes the components for the number of crank pins, radius of orbital rotation of the crank pins, diameter of the pins, and width of the crank pins between the webs.

Described generally, with reference to FIGURES 1, 2, 11 and 12, the four pin tool package 3 includes four tool carriers 8 supported upon a pair of master crankshafts 10 and 11 which impart orbital motion to the tool carriers 8 in time with the orbital motion imparted to the crank pins 12 of the crankshaft 4 (FIGURE 13). The tool carriers 8 include four tool holders 13, each including a forming and cheeking tool 14. The crankshaft 4 is mounted at opposite ends between a pair of companion headstocks 15 and 16 (FIGURES 1 and 2), each including a chuck indicated generally at 17. As described later in detail, the headstocks 15 and 16 are both driven and the crankshaft is correctly indexed by means of milled areas machined into the end counterweights.

In addition to the chucks, the machine is also provided with one or more steady rests indicated generally at 18 (FIGURES 1 and 2) which support the intermediate portions of the crankshaft (main bearings) during the machining operation. During the machining operation, the forming and cheeking tools 14 are fed into the work by means of a pair of feed cams indicated generally at 20—20 (FIGURES 11 and 17) which are mounted for rotation in the base 1 of the machine, and which act against the cradle and consequently the tool package which rests upon the cradle.

The feed cams are driven at a rate of rotation timed with the rotation of the crankshaft 4 and other components of the machine. The cams are arranged to advance the cutting tool 14 into the work at a coarse feed or rapid traverse rate, then at a fine feed rate for pin turning, and finally to provide a dwell period for the final sizing of the pins.

The starting position of the cam 20 is indicated in FIGURES 9 and 15 and the corresponding position of the cam follower and cutting tool is indicated in these views, During the machining process, the cam follower 21, cradle and tool slide advance along the arcuate path indicated by the broken line 22 developed about the center of the pivot axis 23 of the cradle. The cutting tool, while moving in its orbital path, is correspondingly fed into the workpiece along the arcuate path indicated by the broken line 24 (FIGURE 15), also developed about the pivot axis 23. The driving system of the cams is disclosed more completely in the aforesaid Patent No. 3,013,457.

As best shown in FIGURES 2 and 4, the components of the machine are driven in synchronism by means of the gear train indicated generally at 25. The gear train is driven by a motor 19 connected by belts 26 to a pulley 27. As best shown in FIGURE 2, the opposite side of the lathe includes a second gear train indicated at 28 which, combined with the gear train 25, drives both of the chucks 17—17 in unison with one another.

OPERATION GENERALLY

The present machine is developed for manual or automatic operation. In other words, the machine includes an automatic cyling system which causes it to run through one complete cycle upon initiation by depressing a start button. The several operations are then controlled hydraulically with the exception of the chucks 17 and steady rests 18 which are controlled manually.

It will be understood at this point that the main bearings 29 (FIGURE 3 or 21) of the crankshaft 4 or 6 are finished in a separate machining operation before the crankshaft reaches the crankshaft lathe. The accuracy of these previous machining operations has a direct effect upon the accuracy to which the pin bearings are finished, since the main bearings are centered in the chucks 17 and steady rests 18. It will also be understood, at this point, that the crank pins and the spacing between the webs 30 (FIGURES 3 and 21) are machined by the same cutting tools in the present machine.

The chucks 17 are hydraulically operated, as explained later, and are opened and closed by means of pushbuttons, indicated generally at 31 which are mounted in a pushbutton console 32. The console 32 is mounted to the left-hand side of the operator's station (FIGURE 2).

Thus, in manual operation, the operator opens the chucks 17 by depressing an appropriate pushbutton electrically interconnected with the hydraulic circuit; he opens the steady rests 18 which are mechanically operated by means of levers, as explained later. The operator then places the unfinished crankshaft in place with its opposite endwise portions located within the chucks 17—17 and properly indexed with reference to the flat area of the endwise throws or webs, as explained later. He then presses a push button which causes the chucks 17 to be closed under hydraulic pressure. Thereafter, the steady rests 18 are closed mechanically to embrace one or more of the intermediate line bearings, thus setting up the machine for its operating cycle.

At this point (under manual control), the operator presses the rapid traverse button for the tool carriers 8 (feed cams 20) then a start button is depressed to start the machining operation, and finally, at the end of the cycle, a stop button is depressed to stop the machine and to position the chucks 17 rotationally for unloading the finished crankshaft 4 or 6. A button is then depressed to open the chucks 17, the steady rests 18 are opened mechanically, and the finished crankshaft is removed from the machine with the parts in a position to receive the next one for finishing.

Under automatic cycling the operator loads the unfinished crankshaft into the chucks in the same manner, closes the chucks hydraulically by operation of a pushbutton and closes the steady rests mechanically. He then depresses a start button causing the machine to run through its cycle automatically, including rapid traverse (feed cams 20) operation of power motor during the operating cycle, feeding of the cutting tools (tool package) at the traverse rate, cutting rate and dwell time for final sizing of the crank pins. At the end of the cycle the machine is stopped with the chucks 17 rotated to unloading position then the chucks are opened by push button operation, the steady rests are opened and the finished crankshaft is removed in the same manner as in manual operation.

During the machining operation, coolant nozzles (not shown) project liquid coolant upon the cutting zone of the crank pins, the coolant being collected at the base of the machine, screened and recirculated in the usual way. The cuttings and chips impinge upon an angular deflector 39 (FIGURE 15) and drop by gravity to a vibratory feeder 33 which is actuated by a plurality of vibrator coils 33a which are mounted upon the base 1 of the machine (FIGURE 15). The feeder 33 is in the form of a plate projecting from the forward edge of the base to receive the cuttings from the deflector 39; the rearward end of the feeder projects beyond the rearward edge of the base and to a receptacle (not shown) arranged to receive the cuttings as they are discharged from the feeder.

It is to be noted that the present invention is concerned primarily with the mechanical aspects of the machine; therefore, the hydraulic and electrical control system has been omitted from the disclosure.

Base

As best shown in FIGURES 11 and 12 the base 1 or the machine comprises a rigid casting which extends substantially for the full length and width of the machine. A bed 34 rises upwardly along the forward edge portion of the base. As explained later in detail, the companion headstocks 15 and 16 are mounted on the bed 34 which includes ways 35 at its upper end for supporting the headstocks 15 and 16.

For this purpose, the bed includes a pair of hardened rails 36 and 37, the base of the headstocks 15 and 16 being machined to slidably interfit the rails 36 and 37. This arrangement permits the headstock 16 to be adjusted along the bed to accommodate the four-throw or six-throw crankshafts, as explained later.

The steady rest or rests 18 are also mounted upon the ways 36 and 37 of the bed, the base of the steady rests being machined in the same manner as the headstocks to interfit the hardened rails 36 and 37. The steady rests 18 are adjustable along the bed to permit them to be adjusted for the four-throw crankshaft (FIGURE 2) or for the six-throw crankshaft (FIGURE 20).

In order to facilitate lengthwise adjustment of the headstocks 15 and 16 and of the steady rests 18, the forward edge of the bed 34 is provided with a rack 38 (FIGURES 1 and 2). As explained later in detail, the movable headstock 16 and the steady rests 18 are provided with pinions meshing with the rack, the pinions including tool-engaging portions permitting the pinions to be rotated, thereby to locate the headstocks and steady rests. These components also include hold-down bolts adapting them to be clamped rigidly in adjusted position with respect to the bed.

The feed cams 20—20 are mounted in the base 1 on a cam shaft 40 (FIGURES 10, 11 and 17) journaled in bearings 41 which are mounted in the base. The right-hand end of the cam shaft 40 projects outwardly beyond the base and is keyed to a feed box 42 adapted to rotate the feed cams 20 at the relatively slow rate which determines the traverse rate, the coarse feed rate, the fine feed rate and the dwell time for final pin sizing. The feed box 42 preferably is hydraulically operated and may be arranged to control the sequence of operations of the machine as it advances the cams from a starting position (FIGURE 15) to the final sizing position as shown in FIGURE 11. At this point, the cams are stopped and the cycle is ended.

Thus, under manual operation the operator presses an appropriate start button to start operation of the feed box 42 so as to rotate the cams at the appropriate slow rate from their starting position to the final position. During this operation (manual) the operator presses the push buttons for the several machine functions as outlined earlier, then returns the cam back to its starting position by operation of a push button.

Under automatic cycling the operation of the cams is controlled automatically, in that the cams rotate from the starting position at the proper rates in inches per spindle revolution to the final sizing position, then return automatically back to the starting position.

As best shown in FIGURES 15 and 17, the rearward portion of the base 1 is provided with a pair of bearing standards 43—43 rising upwardly from the base. These standards 43 provide a bearing support for the cradle 2 which is pivoted upwardly during the cutting cycle, as noted earlier, by operation of the feed cams 20—20. As explained later, the cradle 2 fits between the standards 43 and a main pivot shaft 45 passes through the cradle and through the standards 43 and forms the cradle pivot axis 23. In other words, the cradle 2, the tool package 3 and the cutting tools 14 all swing about the pivot axis as a unit during the feeding motion which is imparted by the feed cams 20.

The base includes a lateral extension 46 (FIGURE 4) projecting outwardly and providing a mount for a gear housing 47. The gear housing 47 forms a part of the gear train 25 and includes bearings journaling the main drive pulley 27. As explained later in detail, one of the gears within the gear housing 47 is centered upon the main pivot shaft 45 (axis 23) of the cradle so as to permit the upward feeding motion of the cradle without disturbing the meshing of the gears.

Cradle

The cradle 2 essentially comprises a platform 48 (FIGURES 15 and 17) having a pair of bearing plates 50—50 depending downwardly from its opposite side edges. The cradle is of rigid construction and provides a firm support for the interchangeable tool packages 3 and 5 which are seated upon it. As noted earlier, the rearward portion of the cradle is pivotally mounted upon the base upon the main pivot shaft 45 (axis 23). The forward or swinging end portion of the cradle is provided with a pair of cam followers or rollers 21 mounted upon a shaft 52 which extends across the forward swinging end portion of the cradle (FIGURES 15 and 17). These rollers track upon the feed cams 20 of the base 1, as explained earlier with reference to the FIGURES 9 and 11.

The rearward edge of the cradel, above the main pivot shaft 45, is arranged to center the tool packages 3 or 5 with reference to the cradle and other components of the machine. For this purpose, the upper surface of the cradle is provided with a V-shaped groove 53 (FIGURES 15 and 17) with a plurality of centering rods 54 seated in the groove and secured therein by means of screws 55. Each tool package is provided with pairs of locating blocks 56 which embrace the diametrically opposite sides of the centering rods and thus locate the tool package in the forward and rearward directions with respect to the cradle. The forward portion of each tool package is provided with a pair of hydraulic pistons which aid in seating the interchangeable tool packages with reference to the cradle, as explained later.

In order to provide transverse adjustment of the tool package with reference to the cradle, there is provided an adjustment block 57 secured by bolts (FIGURE 15) to one side of the cradle. The block 57 is tapped and includes an adjusting screw 58 passing through the block and engaging the end portion of the tool package.

When the tool package is interchanged, the adjustment screw 58 is backed off; with the package in place, the screw is threaded in so as to adjust the tool package transversely, thereby to locate its cutting tools properly with reference to the crank pins of the crankshaft 4 or 6 which is mounted in the chucks.

In addition, the tool package also includes the pair of hydraulic pistons 60 (FIGURES 9, 9A and 10) which are extended downwardly when the tool package is interchanged, as explained earlier. These pistons rest upon the top surface of the cradle when the tool package is placed in position so as to support the tool package in a rearwardly inclined position. After the tool package is located with respect to the centering rods, the hydraulic fluid is exhausted from the pistons 60 to permit the forward portion of the tool package to descend upon the cradle by gravity, thus locating the cutting tools properly with reference to the crankshaft.

When the hydraulic fluid is exhausted from the pistons 60, the tool package descends to its seated position upon the cradle, so that the cradle absorbs the cutting thrusts which are generated by the cutting tools which act upon the workpiece. For this purpose the tool package is provided with a forward bearing pad 61 and the rearward locating block 56. The tool package is secured by screws 62 having heads seated in the T-slots 63 (FIGURE 15) formed in the upper surface of the cradle.

Tool package (four-throw)

As noted earlier, the four-throw tool package 3 (FIGURES 2 and 14) and the six-throw tool package 5 (FIGURE 20) are readily interchangeable with reference to the cradle 2. Essentially, the four-throw tool package comprises a pair of side plates 64 and 65 joined by longitudinal forward and rearward tie bars 66, 67, 56 and 61 which are bolted to the edges of the side plates (FIGURE 15). The master crankshafts 10 and 11 (FIGURE 14) are journaled in the side plates 64 and 65 preferably in roller bearings 68 and 70. The bearings are confined in bores formed in the side plates in the usual way. The side plates include closure caps 71 to seal off the bearings from dust and dirt.

The four-throw tool package is provided with four oscillating tool carriers 8 in the form of plates having upper and lower split bearings 72 and 73 journaled upon the throws 74 of the master crankshafts 10 and 11 (FIGURES 14 and 15). The upper bearing 72 of each oscillating tool carrier 8 comprises a split block having two half-sections 75 and 76 embracing the throws 74 of the master crankshaft 10. This arrangement is designed to provide a sliding fit with respect to the respective throws of the crankshaft thereby to accommodate any slight differences which may exist between the throws of the master crankshafts. For this purpose each oscillating tool carrier includes an opening 87, with a tapered gib plate 88 (FIGURE 15) interposed between one side of the opening and the half section 76 of the bearing. Two adjustment screws 90 in push pull adjust the tapered gib plate longitudinally so as to take up any looseness which may develop in the bearing.

In order to stiffen the upper master crankshaft 10, it includes three intermediate main bearings 94 which are journaled in the intermediate webs 95 which extend parallel with the side plates 64 and 65. The webs 95 include bearing caps 96 secured by screws 97 to the upper ends of the intermediate webs. The lower master crankshaft 11 is similarly journaled in the webs 95 upon bearings 98—98. The lower end portions of the oscillating tool carriers are each journaled upon the throws 74 of the crankshaft 11 in split bearings 73 each contained by a bearing cap 77 secured to the lower end portion of the carrier by screws 78.

The two master crankshafts 10 and 11 are rotated in time with one another by the gear train previously indicated at 25, as described later in detail. It will be understood, at this point, that the gear train includes gears 105 and 106 which are keyed as at 107 to the end portions of the master crankshafts 10 and 11 (FIGURES 4 and 14). These gears are driven in the same direction by means of an idler gear 108 which is rotatably journaled on an idler shaft 110 mounted on the tool package.

In order to locate the cutting tools precisely in the longitudinal direction with reference to the throws of the crankshaft, there is provided a series of bearing liners 111 between each pair of oscillating tool carriers 8 (FIGURES 14 and 15). Liners are also provided between the tool carriers 8 and the side plates 64 and 65 of the tool package. The liners are secured in place preferably by means of the screws (not shown).

The cutting tools (FIGURE 11), which act upon the crank pins 12, each comprise a tool holder, previously indicated at 13 with the forming and cheeking tool 14 mounted in the holder and clamped in place by means of the screws 113. The cutting tools have a width equal to the length of the crank pins so as to finish the entire length of the crank pins without any longitudinal feeding motion.

As best shown in FIGURE 13, the respective tools 14 move precisely in an orbit described by the crank pin as the crankshaft 4 or 6 rotates in time with the master crankshafts 10 and 11. As noted earlier, the cutting tools are all fed into the work at a uniform rate by operation of the feed cams 20 which act upon the cradle and tool package.

Tool package (six-throw)

The six-throw tool package 5, as noted earlier, is interchangeable with the four-throw package 3 with reference to the cradle 2 (FIGURES 2 and 20). The six-throw package 5 (FIGURE 22) is wider than the four-throw package due to the added length of the six-throw crankshaft 6. The six-throw tool package 5, similar to the four-throw package comprises a pair of side plates 114 and 115 joined by a lengthened forward tie bar (not shown) and a rearward tie bar 117 which are bolted to the edges of the side plates. The six-throw tool package 5 includes master crankshafts 118 and 119 journaled in side plates 114 and 115 by means of roller bearings 120 and 121 (FIGURE 22).

The six-throw tool package is provided with six oscillating tool carriers 8 as described earlier and are journaled by bearings 122 and 123 upon the throws 125 of the master crankshafts 118 and 119.

In order to stiffen the master crankshafts 118 and 119, the tool package 5 for the six-throw crankshaft is provided with two intermediate webs 134 provided with bearings 135. Additionally, the lower end portions of the webs 134 are provided with bearings 136. Bearings 135, 136 are retained within the webs 134 in a manner similar to that previously described in conjunction with webs 95 of the four-throw package 3.

The package includes the gears 137 and 138 which are keyed as at 140 to the end portions of the master crankshafts 118 and 119. These gears are driven in the same direction by an idler gear 141 which is rotatably journaled on an idler shaft 142 mounted on the tool package and are rotated in time with one another by the gear train 25, which drives the four-throw package 3.

Headstocks and chucks

The crankshafts 4 or 6 are supported in a pair of companion headstocks indicated generally at 15 and 16 (FIGURES 2, 16, 17 and 20) which are mounted upon the bed 34, as noted earlier. In order to accommodate the length of the two crankshafts 4 and 6, the right-hand headstock, in the present example, is shiftable longitudinally along the ways 36 (FIGURE 11) of the bed 34, while the left-hand headstock is mounted in a fixed position. The two headstocks are identical in construction but are symmetrically opposite to one another.

Described in detail, the left-hand headstock 15 comprises a housing 143 having a front wall 144, a pair of side walls 145—145 and a rear wall 147. A drive shaft 146 extends from the gear train through both headstocks so as to rotate the chucks, previously indicated at 17 (FIGURE 16). Since the right-hand headstock is a duplicate of the left-hand headstocks the following description applies to both.

Each headstock includes a pair of roller bearings 148 mounted in bores and journaling the shaft 146. The bearings are retained in place by means of the closure caps 150—150 in the usual way. Each headstock includes a gear 151 keyed to the drive shaft 146. The right-hand gear 151 is keyed as at 152, the key tapers and includes a head 153 engaged by a screw 154 which permits the key to be released with respect to the shaft and gear to permit the headstock to be shifted longitudinally with respect to the drive shaft 146.

The right-hand gear 151 meshes with a gear 155 which is permanently keyed as at 156 to a spindle sleeve 157. The sleeve 157, in each case, is journaled upon roller bearings 158—158 which are mounted in bores 160 formed in the headstock housing in the usual way.

In the present example, the lefthand headstock assembly is mounted in a fixed position along the bed 34 (FIGURE 16), while the right-hand headstock is adjustable longitudinally to accommodate the length of the crankshaft which is being machined.

In order to stabilize the two headstocks, there is provided a tie bar 161 engageable with the upper ends of the companion headstocks. The upper end of the left-hand headstock 15 is secured to the tie bar 161 by means of bolts 162. The lower end of the left-hand headstock 15 is secured permanently to the bed by means of bolts (not shown).

In order to provide adjustment, the right-hand adjustable headstock 16, which is symmetrically opposite to the headstock 15, is slidably connected to the tie bar 161 and bed 34. For this purpose the tie bar 161 includes a T-slot 164 and the top wall 165 of the right-hand headstock includes a pair of screws 166, each having a T-nut 167 engaged in the T-slot. The upper end of the right-hand headstocks is thus clamped rigidly in position with respect to the left-hand headstock.

The lower end of the right-hand headstock includes a V-shaped groove 168 slidably engaging the hardened bed rail 36 to hold the headstock in alignment with the crankshaft and other components upon adjustment (FIGURE 11). The lower surface of the headstock further includes a flat finished surface which seats upon the flat rail 37 of the bed 34.

In order to facilitate adjustment, the right-hand headstock includes an adjustment shaft 170 having at its upper end a tool engaging portion 171 (FIGURE 2). The lower end of the adjustment shaft 170 includes a pinion 172 meshing with the rack 38 previously described. Rotation of the shaft by a suitable tool (with the T-screws 166 loosened) shifts the right-hand headstock longitudinally along the bed. The headstock is locked in its adjusted position by means of clamping blocks 173 (FIGURES 1 and 2) traversed by screws 174, the clamping blocks being adapted to frictionally engage a ledge 169 below the rack 38 of the bed, thereby to hold the headstock firmly in its adjusted position (FIGURE 11).

Each of the companion headstocks 15 and 16 includes a chuck, previously indicated at 17, the chucks being duplicates but being symmetrically opposite to one another. The chucks are disclosed in greater detail in the copending application of Otto Hermann, Ser. No. 449,991, filed on Apr. 22, 1965.

Figure 19:
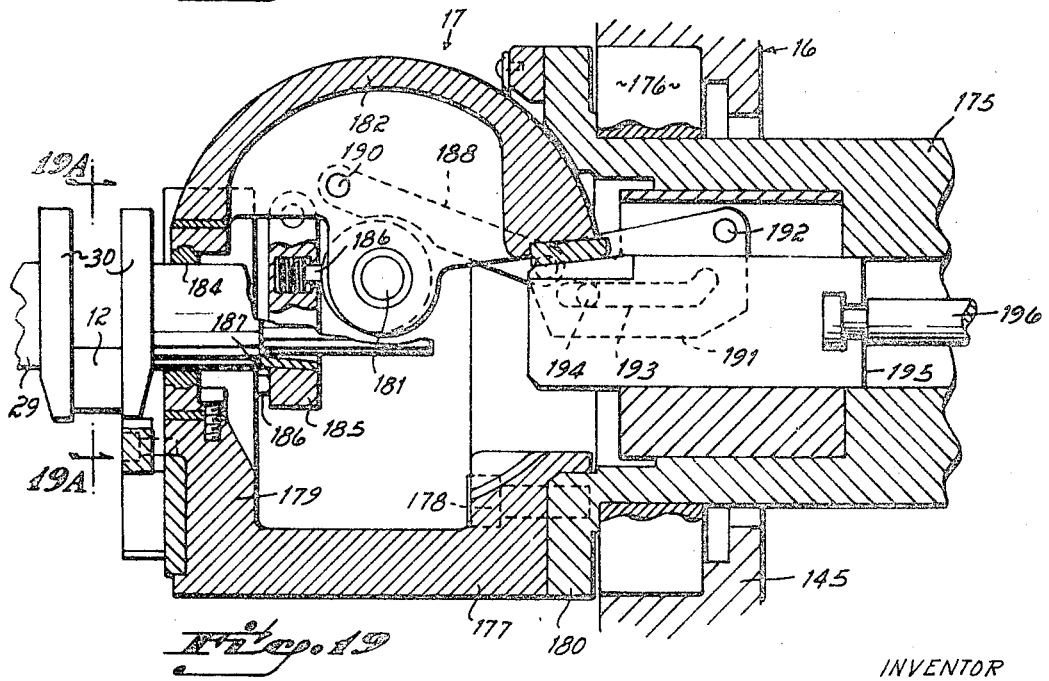
FIGURE 19 is a view similar to FIGURE 18, showing the jaw of the chuck in its closed position.

Described with reference to FIGURES 16, 18 and 19, each chuck is mounted upon a hollow spindle shaft 175 which is journaled in the side walls 145—145 of the headstock housing 143. In order to provide a snug running fit, the side walls 144 are provided with openings having bearings 176 (FIGURES 16 and 18).

Described with reference to FIGURES 18, 19 and 19A, each chuck 17 comprises a body portion 177 which is secured by screws 178 to a flange 180 which forms a part of the hollow spindle shaft 175. The body portion 177 of the chuck includes a front wall 179 on opposite sides upon which there is pivoted as at 181 a jaw element 182. The front wall 179 of each chuck includes a U-shaped opening 184 for the reception of the end portion of the crankshaft which is to be machined. The crankshaft is inserted within the chucks with the jaws 182 swung to the open position shown in FIGURE 18.

When the crankshaft is placed in position within the chucks, a web portion of the crankshaft projects into the body 177 of the chuck with the flat portion 183 of the webs or counterweight in a position to be engaged by the drive lugs 189 of the body portion 177. A U-shaped yoke 185, including a pair of spring pressed plungers 186—186, are adapted to force the yoke 185 against a shoulder 187 on the crankshaft so as to locate the crankshaft longitudinally with respect to the machine. The yoke 185 provides axial alignment of the crankshaft within the machine.

Opening and closing of the chuck is carried out by swinging the jaw element 182 about its pivotal axis 181 by hydraulic power. Generally speaking, the clamping motion is developed by means of a link 188 pivoted as at 190 to one end of the jaw element 182 and having its opposite end pivotally connected to a slide block 191. Block 191 is pivotally mounted as at 192 to the hollow spindle shaft 175 which carries the chuck assembly.

In order to close the chuck, the swinging block 191 includes a longitudinal slot 193 traversed by a pin 194 carried by a slide block 195. The pin 194 is mounted within a cross aperture formed in the slide block 195 with the pin 194 traversing the slot 193. The slide block is connected to the piston rod 196 of a hydraulic cylinder (not shown) which shifts the slide block 195 from the open jaw position of FIGURE 18 to the clamping position of FIGURE 19.

Stead rests

In order to stabilize the crankshaft 4 or 6, the bed 34 includes one or more steady rests (FIGURES 1 and 2) to journal the main bearings.

Described with reference to FIGURES 1 and 2, showing the four-throw crankshaft, each steady rest 18 comprises a base 197 slidably mounted upon the bed ways or rails 36 and 37. The base includes a vertical standard 198 having at its upper end a bearing head 200 as described in detail later. The steady rests embrace the main bearings of the crankshaft so as to stabilize the crankshaft and to prevent tool chattering.

Described in detail (FIGURE 1), the base 197 of the steady rest 18 includes a vertical shaft 201, having at its lower end a pinion 202 meshing with the rack 38 of the bed 34. The upper end of the vertical shaft 201 includes a tool-engaging portion 203 adapted to rotate the shaft and pinion, thereby to adjust the steady rest longitudinally along the bed with reference to the crankshaft. In addition, the steady rest includes clamping blocks 204 traversed by screws 205 adapted to clamp the steady rest firmly in its adjusted position along the bed with reference to the crankshaft.

In order to permit insertion and removal of the crankshaft with respect to the machine, the forward side of the head 200 includes a swinging jaw 206 pivoted as at 207 to the bearing head 200 of the steady rest. The fixed portion of the jaw includes a series of ball bearing rollers 208 and the swinging jaw includes a corresponding set of ball bearing rollers 210. In placing the crankshaft in position, the swinging jaw 206 is shifted mechanically by means of its handle 211 to its open position (FIGURE 1). After the crankshaft is clamped in the chuck, the swinging jaw is manually shifted to its closed position, such that the ball bearing rollers 208 and 210 embraces the main bearings of the crankshaft. The steady rest 18 includes a latch 212 for locking the swinging jaw in its closed position.

Storage platform

The storage platform 7 upon which the interchangeable tool packages 3 and 5 supported, preferably is fabricated of wood and, in general, is contoured to simulate the cradle 2 upon which the tool package is seated. Thus, as shown in (FIGURE 6), the storage platform comprises a base 213 configured to include an upstanding portion 214 which corresponds generally with the bed 34 of the base 1. The storage platform includes a second upstanding portion 215 corresponding to the rearward portion of the cradle. The recess 216 which is provided by the forward and rearward portions of the base provides clearance for the gear 106 which forms a part of the gear train, as explained later. It will be understood at this point that the platform supports the tool packages in an angular position corresponding to the position which the packages assume upon being placed on the cradle.

In order to interchange the tool packages, each package is provided with a pair of lugs 217—217, each having a cross shaft 218, extending therebetween (FIGURE 1). Each cross shaft 218 includes a stirrup 220 pivotally connected thereto and engageable by the hooks 221 (FIGURE 2) of a sling 222 which depends from an overhead crane (not shown). The arrangement is such that, upon being lifted by the crane, the tool package is suspended in balance, at the same angle at which it rests upon the storage platform 7. Upon being transferred to cradle 2 by the crane, the rearward side (locating blocks 56, FIGURE 9) seats upon the locating rods 54, with the forward side of the tool package 3 or 5 slightly elevated.

Each package 3 or 5 is provided with the pair of hydraulic pistons 60 in respective bores 224 formed in the lower portion of the tool package at its forward side (FIGURES 6 and 9). A pair of branch conduits 225 connect the bores 224 with a hydraulic cylinder 226. The cylinder includes a piston which is actuated by a screw shaft 228. The hydraulic piston is operated manually, for which purpose the screw shaft 228 includes a crank 230 (FIGURE 9).

When a selected tool package 3 or 5 is placed upon the cradle, the operator rotates the crank 230 to extend the hydraulic pistons 60 (FIGURE 9), such that the ends of the pistons rest upon the top surface of the cradle 2 at its forward side. The operator then rotates the crank 230 to retract its hydraulic piston, thus exhausting the fluid from the hydraulic bores 224 to retract the piston 60, allowing the forward edge portion of the tool package to descend. When the pistons 60 are fully retracted, the tool package at its forward edge rests upon the bearing pad 61 which engages the cradle (FIGURE 11). A series of T-screws is inserted through the pad (not shown) and threaded into respective nuts which are confined in the forward T-slot formed in the forward edge portion of the cradle. After the T-screws are tightened, the lathe is ready for operation.

Gear train

The driving system for the machine comprises the main motor 19 having a pulley 233 in driving connection with the pulley 27 by the belt 26. The pulley shaft 236 is journaled in the gear housing 47 which is mounted upon the base 1 of the machine. The pulley shaft 236 includes a pinion 238 meshing with a gear 240 mounted on a shaft 241. Shaft 241 includes a pinion 242 meshing with a gear 243 of shaft 244. Gear 243 meshes with two gears, one of which forms a part of the drive to the master crankshafts, while the second gear drives the workpiece. As shown in FIGURE 4, the gear train for the master crankshafts 10 and 11 comprises the gear 245 of the idler shaft 246 meshing with the gear 106 and thus drives both master crankshafts. In order to time the master crankshafts with respect to the workpiece, the gear 106 of the tool package includes an index mark 252 (FIGURE 9). A pointer 253 secured to the side of the package includes a reference line which registers with the index mark 252. Thus when the tool packages are interchanged the operator checks the index mark 252 for alignment with the pointer 253.

The gear train for the workpiece (crankshaft 4) comprises the gear 254 meshing with the gear 256. Gear 254 is mounted on a shaft 255 journaled in a bracket 258 connected to the base. Gear 254 meshes with the gear 256 of shaft 257. Gear 256 meshes with the gear 151 mounted on shaft 146 of the headstock. Gear 151 meshes with a gear 261 which is keyed to the hollow spindle shaft 262. Shaft 262 is in driving connection with the left-hand chuck 17.

As noted earlier, the shaft 146 passes through both companion headstocks 15 and 16 and includes on its right-hand end the gear 151 of gear train 28 which was noted earlier (FIGURE 16). Gear 151 meshes with a gear 155 which is keyed to the hollow spindle shaft 175. Shaft 175 is connected to the right-hand chuck 17 such that two chucks provide a driving connection with the opposite ends of the crankshaft to provide smooth operation.

Having described my invention I claim:

1. A lathe for machining the pins of crankshafts and the like comprising:
    a base;
    a cradle disposed generally in a horizontal plane and having a rearward edge portion pivotally connected to the base for upward pivotal motion;
    respective chucks supported by the base for rotation relative to the said base and defining a work axis, said chucks adapted to receive and rotate a crankshaft to be machined;
    a tool package mounted on the upper surface of the cradle for upward pivotal motion with the cradle;
    a plurality of cutting tools mounted for orbital motion within said tool package;
    said cutting tools adapted to be presented to the pins of the rotating crankshaft within said chucks from below said work axis;
    means for rotating the chucks and the crankshaft therein and for moving the cutting tools in orbits corresponding to the orbits of rotation of the crank pins;
    and feed means mounted in said base and acting upon said cradle for feeding said cradle, tool package and cutting tools upwardly during the machining operation, whereby the cutting forces which are developed during the machining operation are transmitted downwardly from the cutting tools to the tool package, from the tool package to the cradle and through the pivotally connected portion of the cradle and in part through said feed means directly to the base.

2. A lathe for machining the pins of crankshafts and the like comprising:
    a base;
    a cradle disposed generally in a horizontal plane and having pivot shaft means connecting the rearward portion of the cradle to the base for upward pivotal motion;
    a bed formed along the forward edge portion of the base;
    a pair of companion headstocks mounted upon the bed;
    respective chucks mounted for rotation relative to the headstocks and defining a work axis, said chucks adapted to receive and rotate a crankshaft to be machined;
    a tool package mounted on the upper surface of the cradle for upward pivotal motion with the cradle;
    cutting tools mounted for orbital motion within said tool package;
    said cutting tools adapted to be presented to the pins of the crankshaft within said chucks from below the said work axis;
    means for rotating said chucks and for moving the cutting tools in orbits corresponding to the orbits of rotation of the crank pins;
    and feed means mounted in said base and acting upon said cradle for feeding said cradle, tool package and cutting tools upwardly during the machining operation, whereby the cutting forces which are developed during the machining operation are transmitted downwardly from the cutting tools to the tool package, from the tool package to the cradle and through said pivot shaft and in part through said feed means directly to the base, the cutting forces which react against the rotating crankshaft being transmitted through said chucks and headstocks, bed and also to the base.

3. A lathe for machining the pins of crankshafts and the like comprising:
    a base;
    a cradle having a rearward edge portion pivotally connected to the base for upward pivotal motion;
    a bed formed along the forward edge portion of the base;
    respective chucks mounted for rotation relative to said bed and defining a work axis, said chucks adapted to receive and rotate a crankshaft to be machined;
    a tool package mounted on the cradle for upward pivotal motion with the cradle;
    a plurality of tool carriers mounted in said tool package, each carrier including a cutting tool;
    means in said tool package for imparting orbital motion to said tool carriers and cutting tools;
    means for driving said tool package and said chucks in synchronism with one another, whereby the crank pins of the crankshaft in said chucks describe an orbital path of motion;
    said tool carriers and cutting tools adapted to describe an orbital path of motion corresponding to the orbital path of motion of the pins of the rotating crankshaft in said chucks;
    said cutting tools adapted to be presented to the pins of the crankshaft within said chucks from below said work axis;
    a vibratory feeder extending from the bed rearwardly across the base to the rearward edge thereof for advancing the cuttings from the crankshaft being machined to the rearward portion of the base;
    and feed means mounted in said base and acting upon said cradle for feeding said cradle, tool package and cutting tools upwardly during the machining operation, whereby the cutting forces which are developed during the machining operation are transmitted downwardly from the cutting tools to the tool package, from the tool package to the cradle and directly to the base.

4. A lathe for machining the pins of crankshafts and the like comprising:
    a base;
    a cradle disposed generally in a horizontal plane and having a rearward portion pivotally connected to the base for upward pivotal motion;
    a bed formed along the forward edge portion of the base and including ways along the upper portion thereof;
    a pair of headstocks mounted upon the ways of the bed;
    chuck means rotatably mounted in said headstocks;
    said chuck means defining a work axis and adapted to receive the opposite end portions of a crankshaft to be machined;
    a tool package mounted on the upper surface of the cradle for upward pivotal motion with the cradle;
    a pair of master crankshafts mounted for rotation in said tool package;
    tool carriers journaled on said master crankshafts, each including a cutting tool;
    said master crankshafts adapted to impart orbital motion to said tool carriers and cutting tools, said cutting tools adapted to be presented to the crankshaft from below the said work axis;
    feed means mounted in said base and engageable with the cradle;
    and power means for rotating said master crankshafts and chucks in time with one another whereby the orbital motion described by said cutting tools corresponds with the orbital motion described by the pins of the rotating crankshaft;

said feed means adapted to feed said cradle, tool package and cutting tools upwardly during said orbital motion with the cutting tools presented to the crank pins from below said work axis, whereby the cutting forces which are developed by the cutting tools are transmitted downwardly through the tool package and cradle through the pivotally connected portion of the cradle to the base, and in part, through the said feed means to the base.

5. A lathe for machining the pins of crankshafts and the like comprising:

a base;

a cradle disposed in a generally horizontal plane and having a rearward portion pivotally connected to the base for upward pivotal motion;

respective chucks supported by the base for rotation relative to said base and defining a work axis, said chucks adapted to receive and rotate a crankshaft to be machined;

a tool package demountably carried upon the upper surface of the cradle for upward pivotal motion with the cradle;

a pair of master crankshafts journaled in said tool package for rotation therein;

respective tool carriers journaled on said master crankshafts each including a cutting tool adapted to machine a respective pin of the crankshaft, said master crankshafts adapted to impart orbital motion to said tool carriers and cutting tools corresponding to the orbital motion of the pins of the rotating crankshaft;

a gear train journaled on said tool package interconnecting the master crankshafts for rotation in synchronism with one another in the same direction;

and power means for driving said gear train, thereby to rotate the master crank shafts in synchronism with one another;

said cutting tools adapted to be presented to the pins of the rotating crankshaft within said chucks from below said work axis when the tool package is mounted upon the cradle, whereby cutting forces which are developed by the cutting tools are transmitted downwardly through the tool package and cradle and through the pivotally connected rearward portion of the cradle to the base, the cutting forces which react upwardly through the rotating crankshaft being transmitted from said chucks to said base.

6. A lathe for machining the pins of crankshafts and the like comprising:

a base;

a cradle disposed generally in a horizontal plane and having a rearward portion pivotally connected to the base for upward pivotal motion;

respective chucks supported by the base for rotation relative to said base and defining a work axis, said chucks adapted to receive and rotate a crankshaft to be machined;

a tool package demountably carried upon the upper surface of the cradle for upward pivotal motion with the cradle;

a pair of master crankshafts journaled in said tool package for rotation therein;

respective tool carriers journaled on said master crankshafts each including a cutting tool adapted to machine a respective pin of the crankshaft, said master crankshafts adapted to impart orbital motion to said tool carriers and cutting tools corresponding to the orbital motion of the pins of the rotating crankshaft;

a first gear train journaled on said tool package interconnecting the master crankshafts for rotation in synchronism with one another in the same direction;

a second gear train journaled on the cradle meshing with the first gear train of said tool package for driving the same;

and a third gear train journaled in said base and in driving connection with said chucks for rotating said chucks and the crankshaft therein in synchronism with said master crankshafts and in the same direction;

said second gear train of the cradle including a driving gear journaled on the pivot axis of the cradle and meshing with said first gear train of the tool package and with the third gear train of said chucks for driving the same in synchronism;

said cutting tools adapted to be presented to the pins of the rotating crankshaft within said chucks from below said work axis when the tool package is mounted upon the cradle, whereby the cutting forces which are developed by the cutting tools are transmitted downwardly through the tool package and cradle and through the pivotally connected rearward portion of the cradle to the base, the cutting forces which react upwardly through the rotating crankshaft being transmitted from said respective chucks to said base.

7. A lathe for machining the pins of crankshafts and the like comprising:

a base;

a cradle disposed generally in a horizontal plane and having a rearward portion pivotally connected to the base for upward pivotal motion;

respective chucks supported by the base for rotation relative to said base and defining a work axis, said chucks adapted to receive and rotate a crankshaft to be machined;

a tool package demountably carried upon the upper surface of the cradle for upward pivotal motion with the cradle;

a pair of master crankshafts journaled in said tool package for rotation thereon;

respective tool carriers journaled on said master crankshafts each including a cutting tool adapted to machine a respective pin of the crankshaft, said master crankshafts adapted to impart orbital motion to said tool carriers and cutting tools corresponding to the orbital motion of the pins of the rotating crankshaft;

a first gear train journaled on said tool package interconnecting the master crankshafts for rotation in synchronism with one another in the same direction;

a second gear train journaled on the cradle meshing with the first gear train of said tool package for driving the same;

a third gear train journaled in said base and in driving connection with said chucks for rotating said chucks and the crankshaft therein in synchronism with said master crankshafts and in the same direction;

said second gear train of the cradle including a driving gear journaled on the pivot axis of the cradle and meshing with said first gear train of the tool package and with the third gear train of said chucks for driving the same in synchronism;

said cutting tool adapted to be presented to the pins of the rotating crankshaft within said chucks from below said work axis when the tool package is mounted upon the cradle;

and feed means mounted in said base and acting upon said cradle for feeding said cradle, tool package and cutting tools upwardly during the machining operation, whereby the cutting forces which are developed during the machining operation are transmitted downwardly from the cutting tools to the tool package, through the cradle through the pivotal connection of the cradle and in part through said feed means of the cradle and directly to the base.

8. A lathe for machining the pins of crankshafts and the like comprising:

a base;

a cradle having a rearward portion pivotally connected to the base for upward pivotal motion;
a bed formed along the forward edge portion of the base and including ways along the upper portion thereof;
a pair of headstocks mounted upon the ways of the bed, at least one of said headstocks being mounted for longitudinal shifting motion along said ways of the bed;
chuck means rotatably mounted in said headstocks, and adapted to rotatably confine the opposite end portions of crankshafts having different lengths;
said chuck means defining a work axis and adapted to receive the opposite ends of a crankshaft to be machined;
a tool package demountably carried upon the cradle for upward pivotal motion with the cradle;
said demountable tool package adapted to machine a crankshaft having a given length;
cutting tools mounted for orbital motion within said tool package;
said cutting tools adapted to be persented to the pins of the rotating crankshaft within said chucks from below said work axis;
a locating rod mounted on the rearward portion of said cradle;
locating blocks mounted on the rearward portion of said tool package engageable with said locating rod, thereby to locate the demountable tool package transversely with reference to the cradle;
and feed means mounted in said base and acting upon said cradle for feeding said cradle, demountable tool package and cutting tools upwardly during the machining operation, whereby the cutting forces which are developed during the machining operation are transmitted downwardly from the tool package, to the cradle and directly to the base.

9. A lathe as set forth in claim 8 in which the bed is provided with a rack and in which the shiftable headstock is provided with a pinion meshing with said rack, said pinion having tool engaging means engageable by a tool, adapting said pinion to be rotated, thereby to locate the headstock longitudinally along the bed.

10. A lathe as set forth in claim 9 in which the bed of the base is provided with an overhanging ledge and in which the shiftable headstock includes a clamping element engaging said ledge, and clamping means for drawing said clamping element firmly into engagement with said ledge upon adjustment of the headstock.

11. A lathe as set forth in claim 9 in which the bed is provided with one or a plurality of steady rests, at least one of said steady rests being shiftably mounted upon the ways of said bed, said steady rest including a pinion rotatably mounted therein and meshing with said rack, and tool engaging means adapted to be engaged by a tool for rotating said pinion, thereby shifting said steady rest longitudinally with respect to the ways of the bed.

12. A lathe as set forth in claim 11 in which the steady rest is provided with a clamping element engageable with said ledge, and a screw element engaging said clamping element and adapted to clamp the same in an adjusted position with reference to said ledge, thereby locating the steady rest longitudinally in a fixed position with reference to the bed.

13. A lathe for machining the pins of crankshafts and the like comprising:
a base;
a cradle having a rearward portion pivotally connected to the base for upward pivotal motion;
a bed formed along the forward edge portion of the base and including ways along the upper portion thereof;
a pair of headstocks mounted upon the ways of the bed, at least one of said headstocks being mounted for longitudinal shifting motion along said ways of the bed;
chuck means rotatably mounted in said headstocks, and adapted to rotatably confine the opposite end portions of crankshafts having different lengths;
said chuck means defining a work axis and adapted to receive the opposite ends of a crankshaft to be machined;
a tool package demountably carried upon the cradle for upward pivotal motion with the cradle;
said demountable tool package adapted to machine a crankshaft having a given length;
cutting tools mounted for orbital motion within said tool package;
said cutting tools adapted to be presented to the pins of the rotating crankshaft within said chucks from below said work axis;
a locating rod mounted on the rearward portion of said cradle;
locating blocks mounted on the rearward portion of said tool package engageable with said locating rod, thereby to locate the demountable tool package transversely with reference to the cradle;
longitudinal locating elements secured to the opposite ends of said interchangeable tool package;
locating screws threaded through said locating elements and having ends engageable with said locating rods, thereby to locate the demountable tool package longitudinally with reference to the cradle;
and feed means mounted in said base and acting upon said cradle for feeding said cradle, demountable tool package and cutting tools upwardly during the machining operation, whereby the cutting forces which are developed during the machining operation are transmitted downwardly from the tool package, to the cradle and directly to the base.

14. In a lathe for machining the pins of crankshafts and the like, said lathe having a base, a cradle having a rearward portion pivotally connected to the base for upward pivotal motion, said rearward portion of the cradle having a locating rod secured thereon, and respective chucks mounted for rotation relative to said base and defining a work axis, said chucks adapted to receive and rotate a crankshaft to be machined, a demountable tool package having a rearward portion pivotally seated upon said locating rod and adapted to be supported upon said cradle, said tool package comprising:
a pair of side plates;
a pair of master crankshafts having main bearings rotatably journaled within said side plates;
said crankshafts including a plurality of throws;
a plurality of tool carriers journaled on the throws of said master crankshafts;
and respective cutting tools carried by said tool carriers and adapted to act upon the pins of a crankshaft mounted in said chucks from below the work axis defined by said chucks.

15. A lathe as set forth in claim 14 in which the main bearings of at least one of said crankshafts are journaled in bearing blocks which are slidably mounted in said side plates, thereby to accommodate for minor irregularities in the throws of the pair of master crankshafts.

16. A lathe as set forth in claim 15 in which the bearing blocks are generally square in configuration as viewed from the end of the master crankshaft and in which the side plates include openings configurated to slidably receive the bearing blocks, the openings providing clearance between the upper and lower edges of the bearing block to permit vertical motion thereof and a tapered gib plate disposed between said bearing block and one side of said opening for adjustment of the bearing block relative to said opening.

17. A lathe as set forth in claim 14 in which the forward portion of the tool package is provided with a plurality of hydraulic cylinders, respective hydraulic lift pistons mounted in said cylinders and having outer end portions projecting outwardly from the lower forward edge of the tool package and engageable with the top surface of the cradle thereby to support the tool package with its forward end elevated and with its rearward end engaged by said locating rod, and hydraulic means connected to said cylinders adapted to advance or retract said hydraulic lift pistons thereby to pivot the rearward portion of the tool package about said locating rod and to raise or lower the forward portion of said tool package with reference to the cradle upon mounting of the tool package upon the cradle.

18. A lathe as set forth in claim 17 in which there is provided a power cylinder communicating with said cylinders for operating said hydraulic lift pistons and having a power piston, and hand-operated means for actuating and power piston, thereby to advance or retract said lift pistons.

References Cited

UNITED STATES PATENTS

| | | | |
|---|---|---|---|
| 2,596,511 | 5/1952 | Siekmann et al. | 82—9 |
| 2,612,069 | 9/1952 | Groene | 82—9 |
| 3,013,457 | 12/1961 | Le Blond et al. | 82—9 |

LEONIDAS VLACHOS, Primary Examiner

U.S. Cl. X.R.

82—34